Oct. 18, 1949.   L. B. SPONAUGLE   2,484,968
METHOD OF OPERATING MACHINE TOOLS
AND APPARATUS THEREFOR
Filed April 8, 1944   11 Sheets-Sheet 3
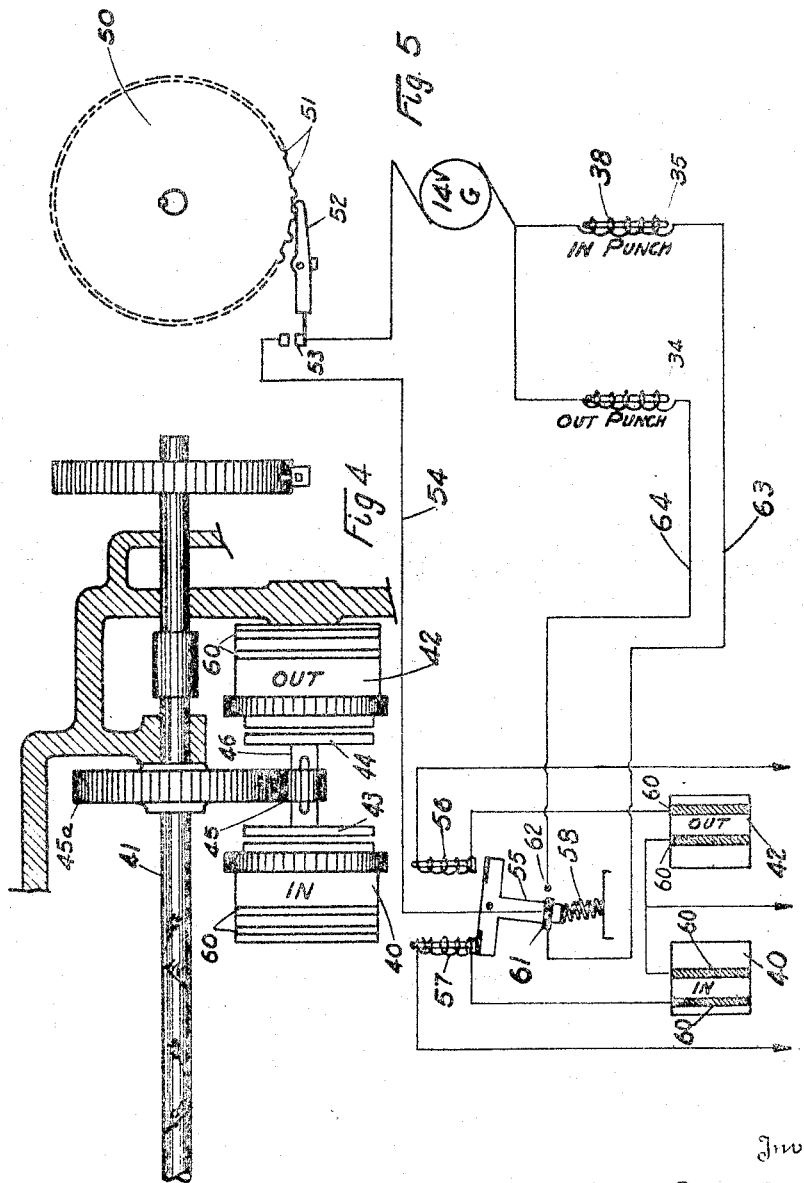
Inventor
LLOYD BLAIR SPONAUGLE

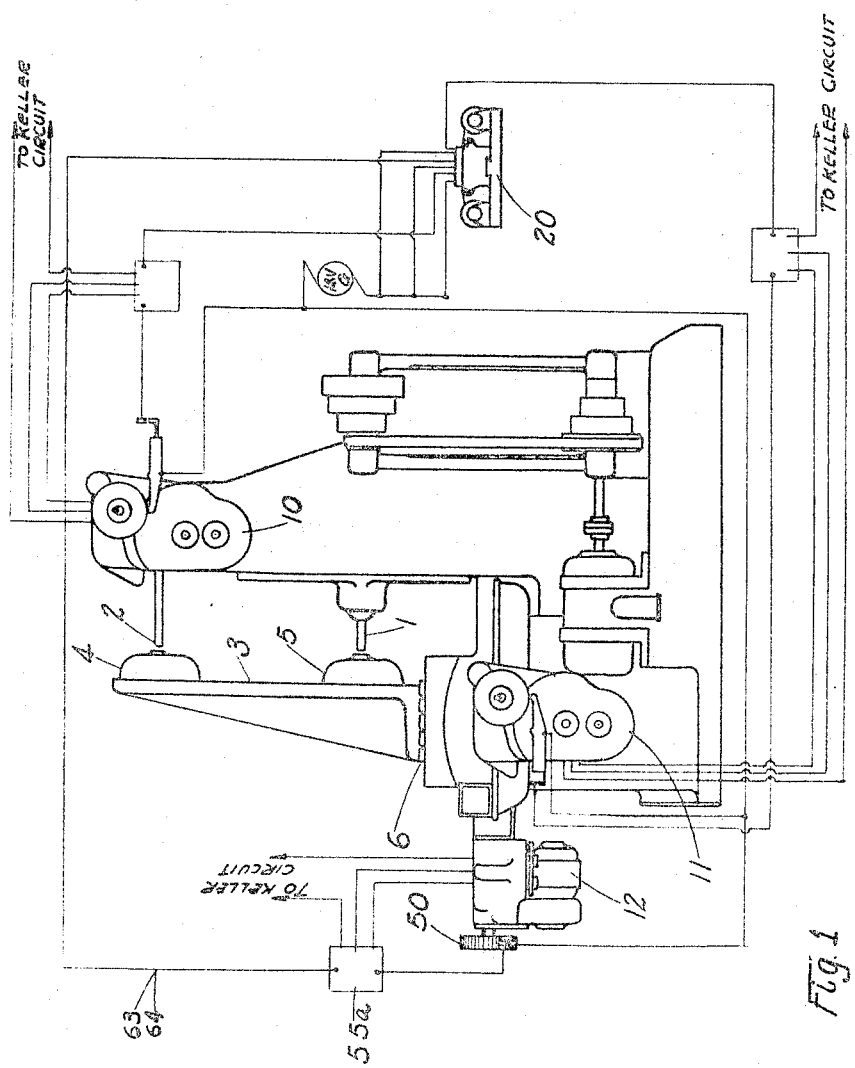

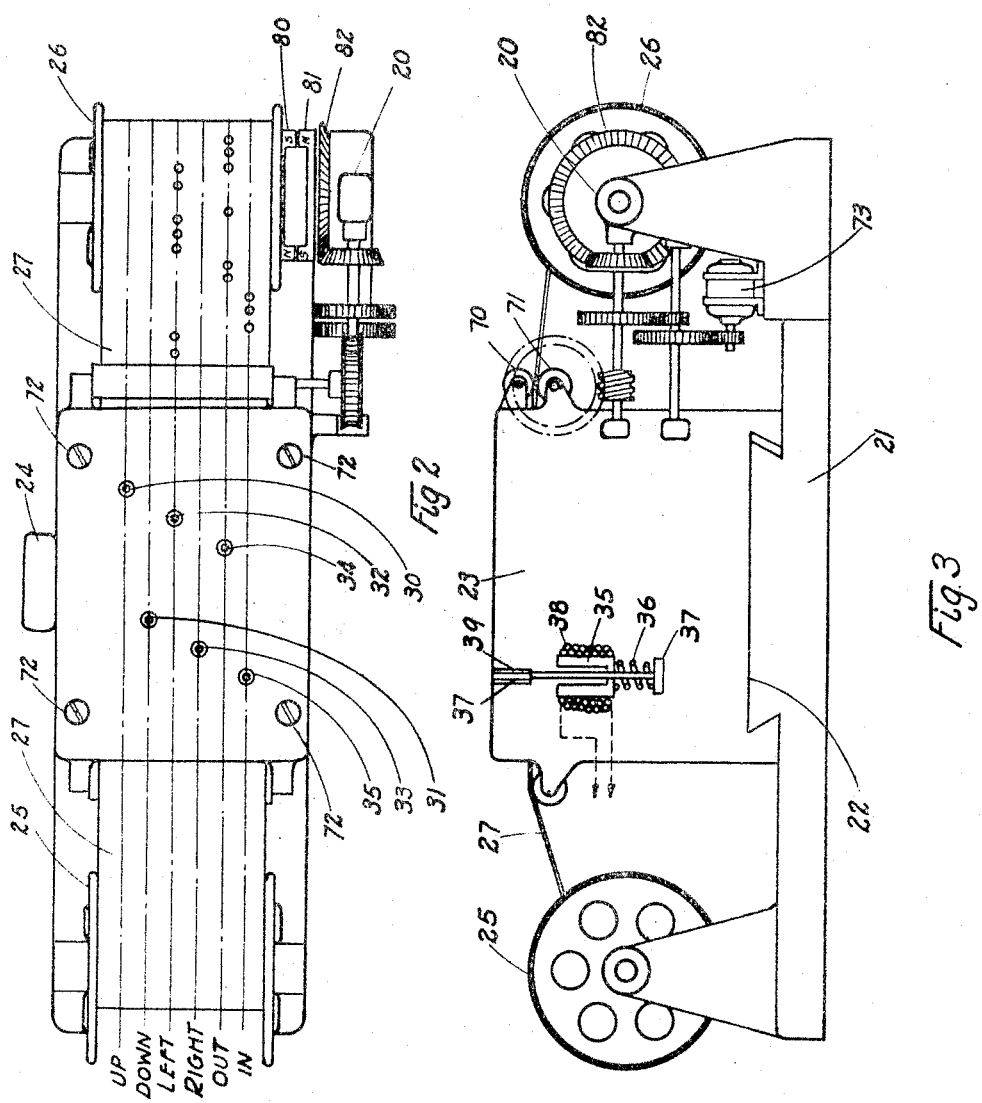

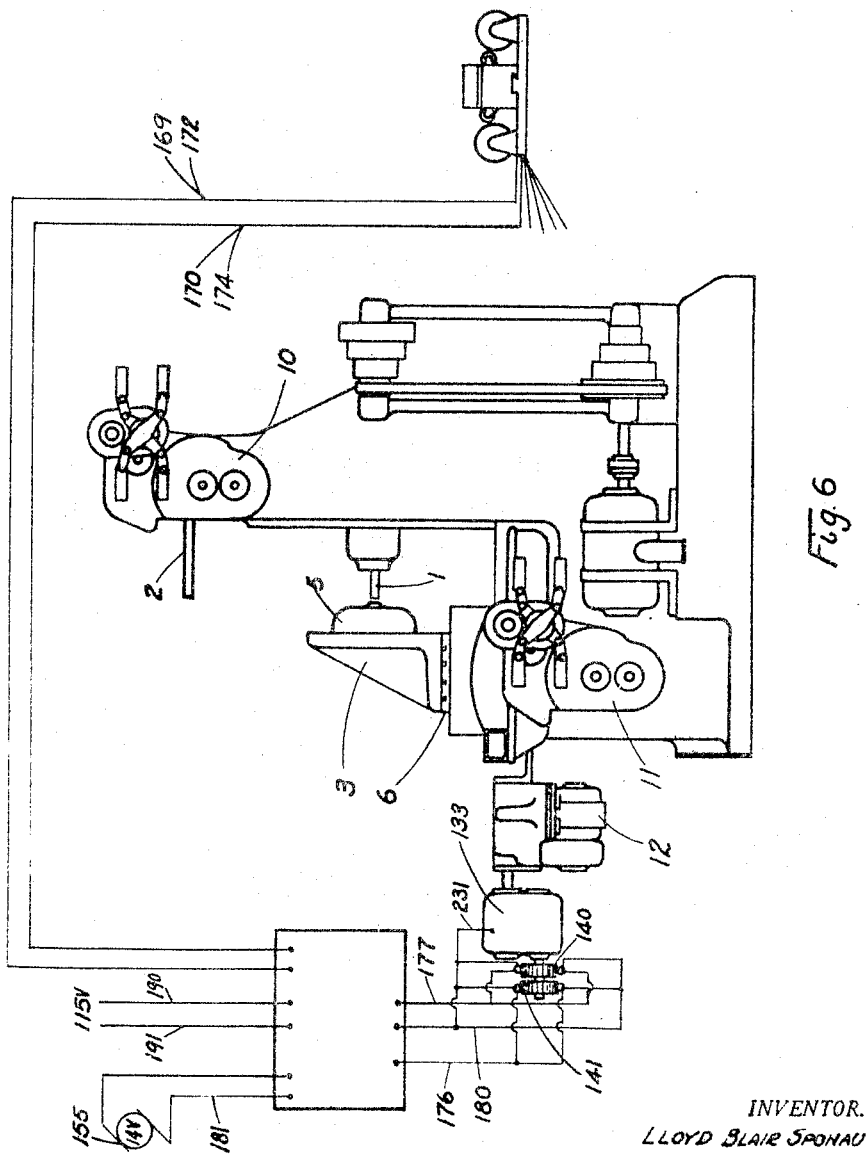

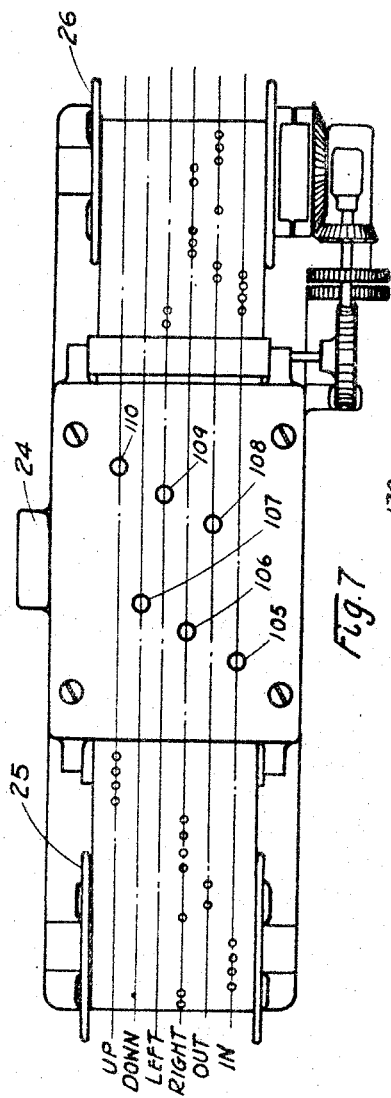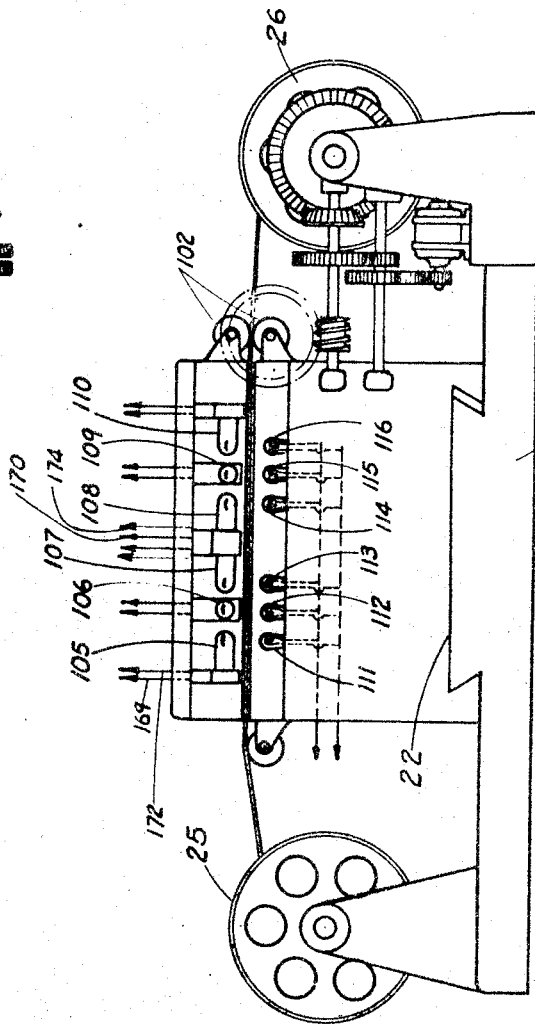

Oct. 18, 1949.  L. B. SPONAUGLE  2,484,968
METHOD OF OPERATING MACHINE TOOLS
AND APPARATUS THEREFOR
Filed April 8, 1944  11 Sheets-Sheet 6
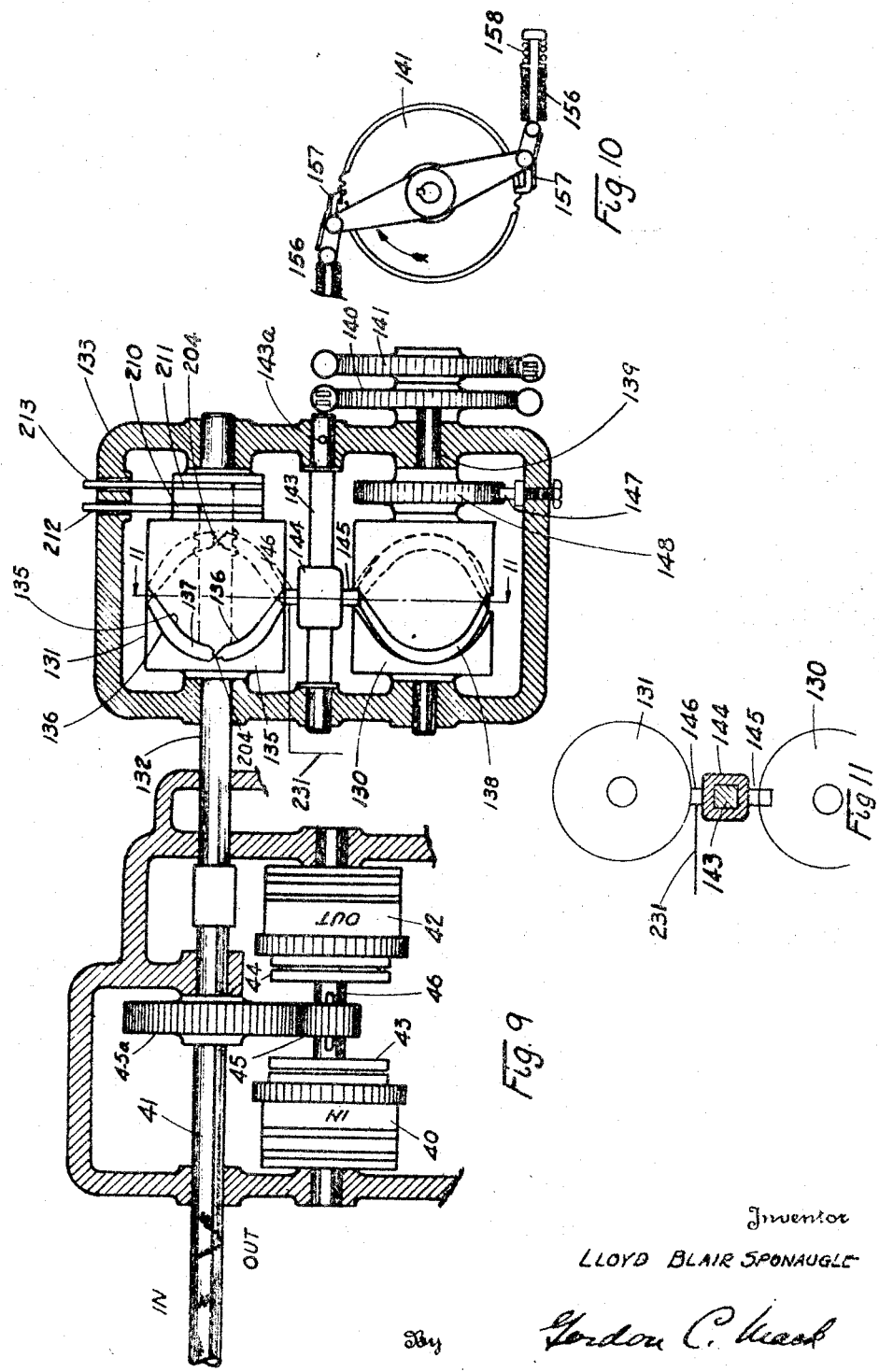
Inventor
LLOYD BLAIR SPONAUGLE
By Gordon C. Mack
Attorney

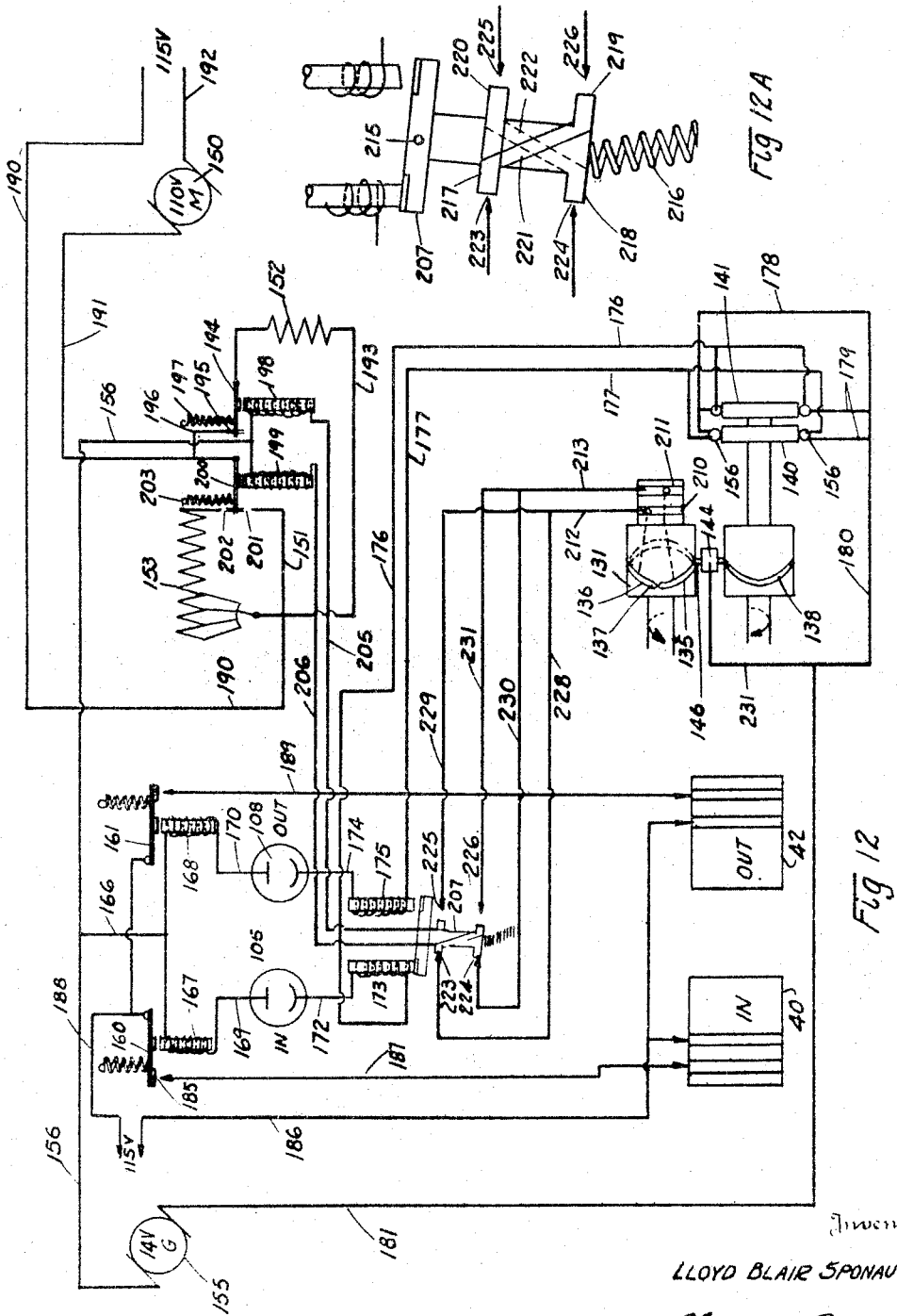

Oct. 18, 1949.  L. B. SPONAUGLE  2,484,968
METHOD OF OPERATING MACHINE TOOLS
AND APPARATUS THEREFOR
Filed April 8, 1944  11 Sheets-Sheet 8
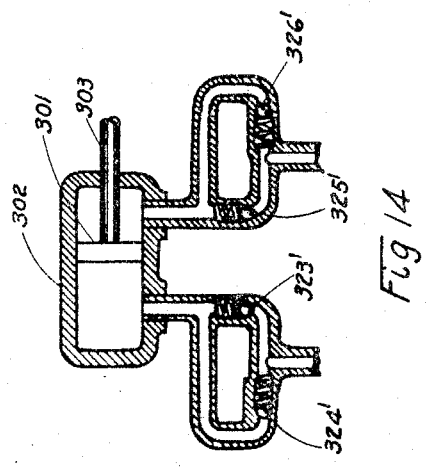
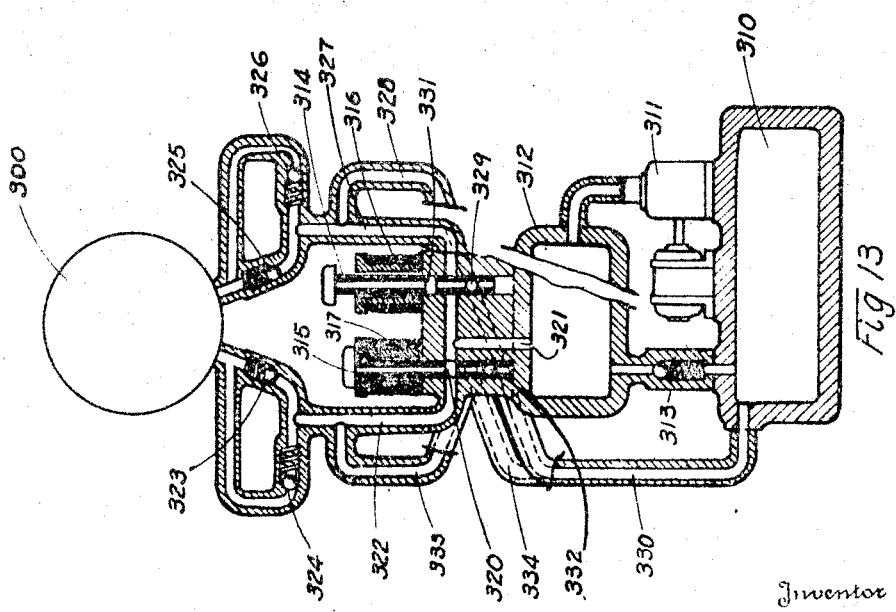
Inventor
LLOYD BLAIR SPONAUGLE.
By Gordon C. Mack
Attorney Oct. 18, 1949.　　　L. B. SPONAUGLE　　　2,484,968
METHOD OF OPERATING MACHINE TOOLS
AND APPARATUS THEREFOR
Filed April 8, 1944　　　　　　　　　11 Sheets-Sheet 9
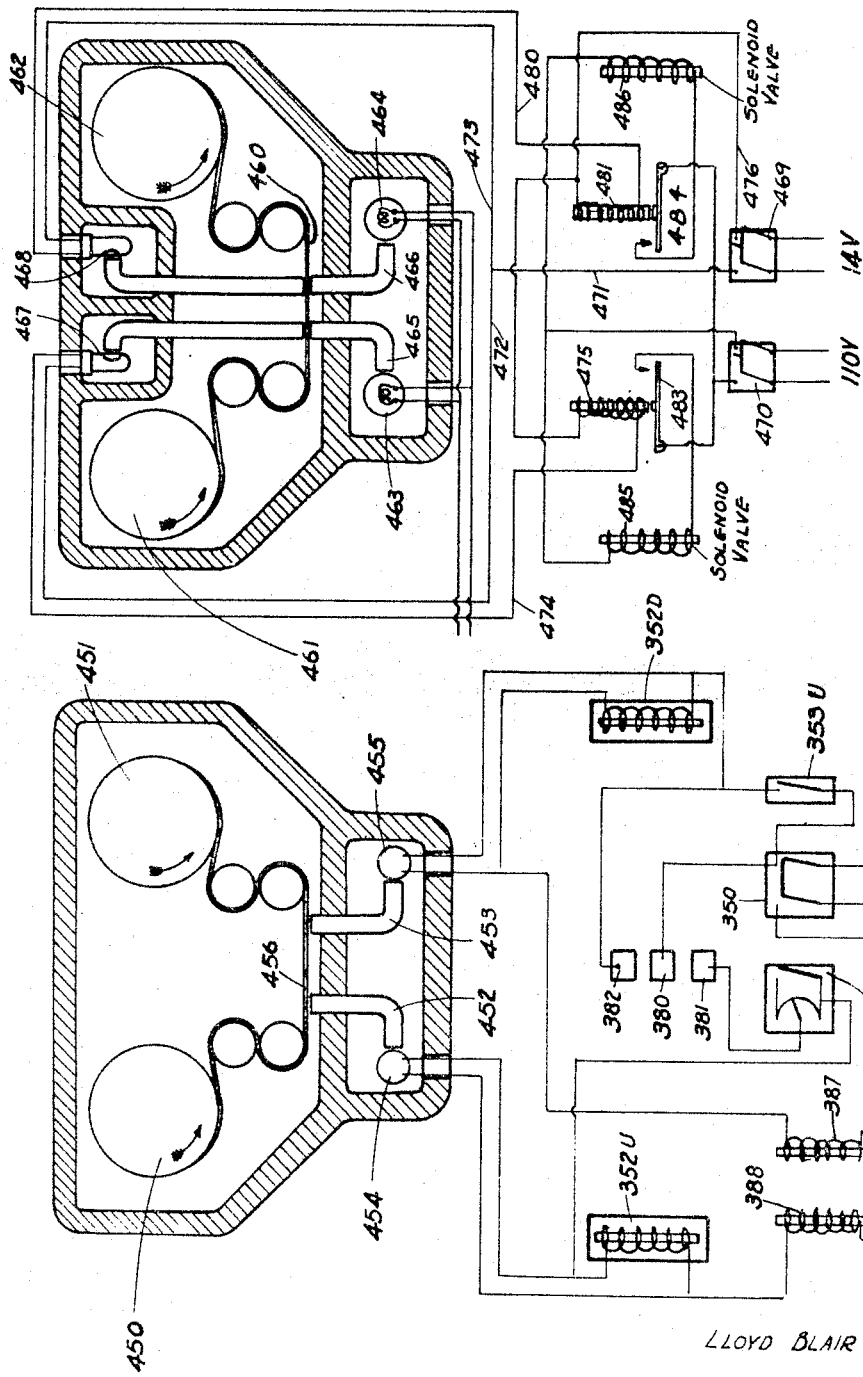
Inventor
LLOYD BLAIR SPONAUGLE
By Jordan C. Mack
Attorney

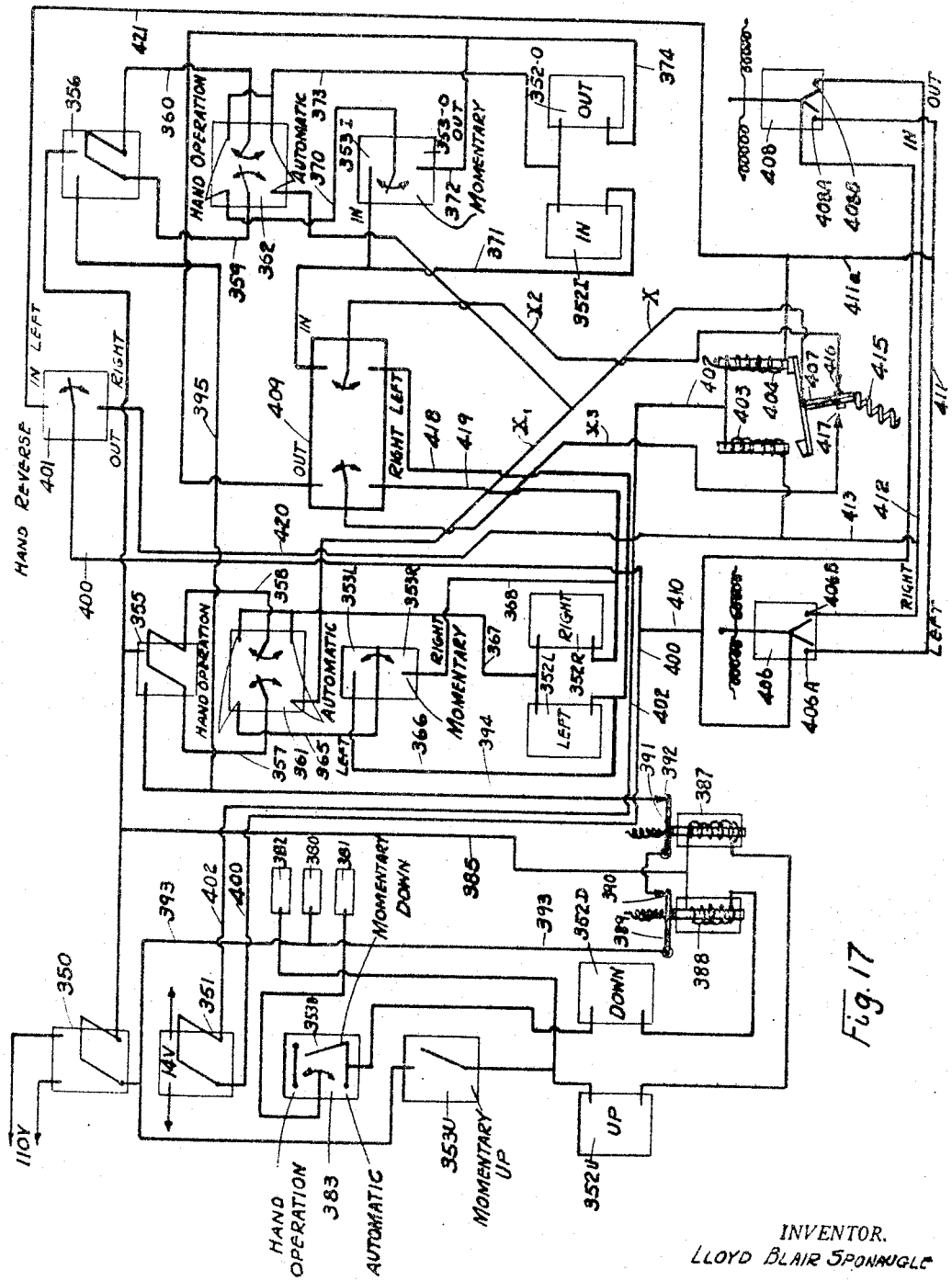

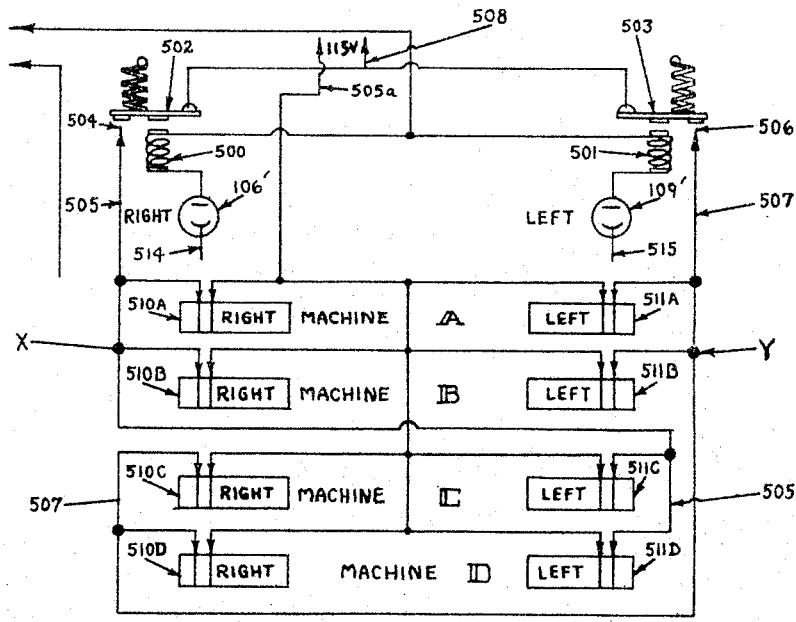
FIG. 18
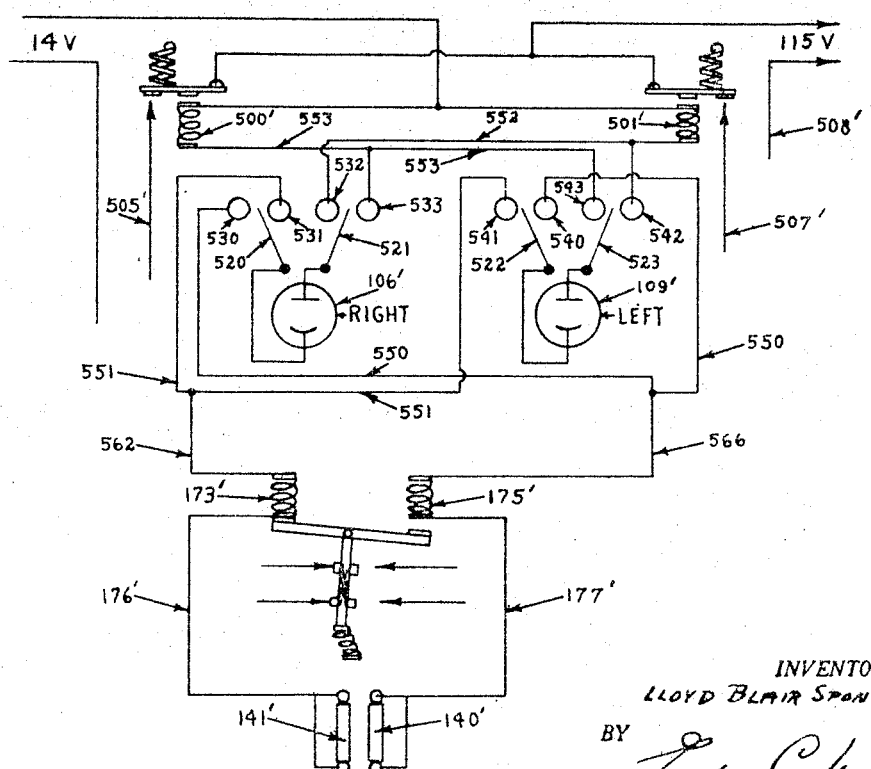
FIG. 19
INVENTOR.
LLOYD BLAIR SPONAUGLE
BY

Patented Oct. 18, 1949

2,484,968

UNITED STATES PATENT OFFICE 2,484,968

METHOD OF OPERATING MACHINE TOOLS AND APPARATUS THEREFOR

Lloyd Blair Sponaugle, Akron, Ohio

Application April 8, 1944, Serial No. 530,086

9 Claims. (Cl. 90—13.5)

This invention relates to a novel method of operating machine tools; that is, for shaping articles by cutting away unwanted material from a block of solid substance, such as, for example, wood, steel, and the like.

More particularly, this invention relates to operating machine tools automatically from a record and includes the method of producing such a record. It includes the operation of several machines from a single record. It also includes the production of opposite parts, such as right and left opposites, from the same record, and simultaneously. Likewise, it includes the production of a record from a miniature model and the production of a full-size reproduction from this record. The invention includes both method and apparatus therefor.

At the present time, machine tools are largely run under the direct control of an operator. By making the operation automatic and controlling all operations of the machine from a record, the operations are more accurately controlled, there is a saving in labor, and other advantages result which will be evident from what follows.

The record employed may be of any suitable type. For example, it may be a paper strip which is perforated so that as it is passed over a source of light, the light passing through the perforations will affect mechanism which operates the machine tool. If preferred, the operation may be dependent upon blowing air through perforations in a tape. Alternatively, a metallic paint may be applied to the tape either in dots or in discontinuous stripes so that the operation of the machine may be controlled through brushes or magnetic switches or the like which are affected by the metallic deposits and thus close electrical circuits. Another type of record is a photographic film on which dots or dashes may be recorded, which, by means of an electric eye, may be made to actuate mechanism which will operate and control the machine tool. The production of a suitable record and the operation of a machine from such a record will be more fully explained in what follows.

The record is made from a model by mechanism which duplicates the operations which the machine is to perform and from which electrical impulses or the like are initiated which produce the record. If the object to be formed is symmetrical so that, for example, the two halves are the reverse of one another, a model of only half the object need be made, and the record for the two halves may be made from this, or the record of the one half may be made from the record of the other half. Likewise, from a record for only half of the work, both halves may be made separately or simultaneously as will be more fully explained. Similarly, if several parts of the object are identical or several parts are the reverse of other parts, records for these may be made without first preparing a model for the whole, as will be more fully explained.

The invention is particularly adapted to the operation of machine tools which involve movement of the tool or work or both in a total of two or three dimensions. Usually the table to which the piece of work is fastened moves in two dimensions, and the cutting instrument remains stationary or is movable in one direction. Sometimes the table moves in only one direction, and the tool moves in either one or two directions. Sometimes the table or the cutting tool is stationary, and all the movements are executed by the tool (if the table is stationary) or the table (if the tool is stationary). The invention is applicable to those machine tools in which either the table or the cutting tool moves, and particularly to those in which the movement of either the tool or table at different times is in opposite directions, as, for example, to the right at one time and to the left at another, or up at one time and down at another. An example of a two-dimensional tool is a milling machine. Here, the cutting tool generally remains stationary, and the table moves from right to left (or left to right) and up and down.

The preferred application of the invention is in the operation of a tool which operates in three dimensions. Such tools are generally known as duplicators, and the invention is applicable to the model-controlled type and to special designs. There are various makes of the model-controlled type on the market. For example, the Keller machine, manufactured by the Pratt and Whitney Company, of West Hartford, Connecticut, is operated electrically. The Duplimatic machine controls manufactured by the Detroit Duplicator Company, of Detroit, Michigan, are operated hydraulically. A further type of duplicator is the Turchan Follower machine, manufactured by the Turchan Follower Company, of Detroit, Michigan, which is operated on the ram principle.

There may be two or more cutting tools on a duplicator, and the principle of operation may be the same regardless of the number, or a number of tools may operate simultaneously on a single work piece as explained below.

In the duplicators the cutting tool is usually adapted to move vertically, both up and down.

The table may be horizontal or vertical. If vertical, the cuttings fall away from the piece of work as the operation is performed. If the table is horizontal, the cutting tool and its spindle will be vertical and point downward, and the vertical movement of the tool toward and away from the work will be known as Up and Down. In this case, the movements of the table will be lengthwise or traverse, and widthwise or transverse. In the preferred form of machine in which the table is vertical and the spindle is supported in a horizontal position, the table movements are In and Out, Right and Left, and the tool or head movements Up and Down. The In and Out movements in a machine whose table is vertical are the movements in which the table approaches the tool and recedes from the tool, respectively.

All model-controlled duplicators are equipped with mechanism for separately moving the table and head in the proper directions. Although reference is made to three dimensions, the movements actually total six; that is, In and Out, Up and Down, Left and Right, for example. According to this invention, a record is first made of the movements of a table and cutting tool which perform the movements necessary to produce a desired job, and then these movements are reproduced from the record by the table and the cutting tool of a duplicator which actually performs the job. Whether the invention is applied to a milling machine or a duplicator, the movements are preferably broken down into short straight-line unit movements, and multiples thereof, in each of the two or three necessary directions which are preferably at right angles to one another. For instance, in a plain milling machine where movements in only two directions are involved, the Right and Left movement is composed of a plurality of short-length unit movements in the one direction or the other, and the Up and Down movements are usually for only the short unit distance, although they may be for a multiple thereof. In a duplicator, any surface is reproduced by the relative movement of the work piece and cutting tool in a series of movements, and according to this invention these are advantageously made up of one or a plurality of the short-length unit movements in the three directions. These taken consecutively, according to the record, duplicate the model. According to the preferred form of the invention described in Figs. 1–12, in producing the record the movements recorded as of unit length or a multiple thereof may be somewhat greater or smaller than the unit or a multiple thereof, but the sum total of the individual movements in opposite directions (i. e., In and Out, Right and Left, etc.) will be the sum total of the recorded units. Also, in reproducing a job from the record, the individual movements of the machine may each be somewhat greater or smaller than the intended unit or multiple thereof, but the sum total of the movements in opposite directions (i. e., In and Out, Right and Left, etc.) will be the sum total of the recorded units, and the individual movements will approximate the recorded units.

In copying a life-sized model, the unit of distance used in analyzing the movements of the tracer is the same as that used in duplicating them in the movements of the cutting tool. If the model is a miniature, the length of the units is a given fraction of the length of the duplicator movements, or the speed of the record may be slower in producing the model than in reproduction, etc. Usually, the units are the same length in all directions; i. e., in two or three directions, depending upon the type of work and apparatus employed. Even in duplicating a spherical or oval surface, for example, the movements of the tracer are broken down into the straight-line movements of approximately unit length in all three directions. On duplication, the contour of the model will be duplicated although it will not be perfectly smooth. Generally, the surface is eventually smoothed off in a suitable finishing operation.

It is not necessary that the movements be of unit length or a multiple thereof although this is one desirable method of operating, particularly on an electrically driven machine.

The invention will be described in greater detail in the accompanying drawings in connection with the operation of duplicators of the type in which the table is moved traversely and transversely and the tool spindle vertically. Three different types of duplicators will be discussed in connection with the drawings. In the electrically operated type the movements of the table and spindle are of unit lengths and multiples thereof. The drawings illustrate the preparation of the record as well as the operation of the machine from the record for each type of machine.

In the drawings Fig. 1 shows more or less diagrammatically a machine of the Keller type in which the table is operated through lead screws by electrical impulses which actuate magnetic clutches, and shows the position of mechanism for moving the table in two directions and for moving the spindle up and down, together with means for making a record. Fig. 2 is a plan view, and Fig. 3 is an elevation (with a portion broken away) of punch mechanism for making a record. Fig. 4 is an enlarged detail of the clutch mechanism for operating one of the lead screws, and Fig. 5 is an end view of the same with details of wiring equipment, etc., for producing a record by mechanism, such as that shown in Figs. 2 and 3. Fig. 6 shows a machine of the Keller type, as in Fig. 1, but connected with a record interpreter. Fig. 7 is a plan view of the interpreter, and Fig. 8 is an elevation with a large portion broken away to show the photo-electric cells and their relation to the tape. Fig. 9 is an enlarged detail of the clutch mechanism for operation of one of the lead screws connected with a compensator. Fig. 10 is an end view of the compensator. Fig. 11 is a section on the line 11—11 of Fig. 9. Fig. 12 is a wiring diagram showing how the compensator is connected with the clutches and the interpreter. Fig. 12A is an enlarged detail of the toggle switch shown in Fig. 12. Fig. 13 is a more or less diagrammatic showing of how the feed lines of an hydraulically operated duplicator may be connected with a record-making machine. Fig. 14 illustrates the same in connection with a machine operated on the ram principle. Figs. 15 and 16 show wiring diagrams for connecting the mechanism of Fig. 13 with a recorder and interpreter, respectively. Fig. 17 is the complete wiring diagram for operating a machine of the type illustrated in Fig. 13. Fig. 18 illustrates the simultaneous production of right and left parts from a single record. Fig. 19 shows a wiring diagram for a single machine adapted to make either a right or a left from the same record.

Figs. 1 and 6 illustrate a duplicator of the Keller type, manufactured by the Pratt and Whitney Company, of West Hartford, Connecticut. The details of its operation and structure are well known and, therefore, are not shown. Fundamentally, the machine is made up of the cutting tool and spindle 1, the movements of which are controlled by the tracer 2. On the work support 3 is a model 4 and a block of solid material 5 on which the cutting tool operates. The support or vertical table 3 is fastened onto the machine table 6. Although in making a record, one may use a machine which does not include the spindle 1, and in working from a record, one may use a machine without a tracer, the invention is here explained in connection with such standard model-controlled equipment.

In duplicating the model 4, the model moves back and forth and also toward and away from the tracer until the tracer has contacted the whole surface of the model in any regular manner. For example, the operation may start with the tracer at the upper left-hand corner of the model, and the table may move so that the movement of the tracer with respect to the model is a straight horizontal line to the right. When the model has moved so that the tracer is at the right edge of the model, the tracer will step down (i. e., "index") a fraction of an inch, perhaps .032 inch, and the movement of the table will be reversed; or the tracer may start in a lower corner, and will then index up. At other times, it may be desirable to divide the area of the surface of the model into four equal squares and cover the surface of each square, starting at the middle and working out. Alternatively, the table and tracer may move so as to follow the contour of an object, as in profiling which is a two-dimensional movement. The method of operating a duplicator according to various general plans is well known and need not be further described here.

In contacting the surface of a model, the tracer follows all irregularities, dipping into cavities as well as contacting the more exposed surfaces. The table 6 and support 3 generally move in only one direction at one time. They may be moving Right or Left, or they may be moving In or Out (i. e., toward or away from the tracer 2 and the cutting tool or spindle 1). The head which carries the tracer 2 and spindle 1 moves Up or Down but is generally momentarily stationary while the table is moving. Therefore, the movement of the tracer with respect to the model and also of the tool with respect to the work piece is in only one direction at a time; and according to the operation described in connection with Figs. 1–12, that movement is of unit length or a multiple of the unit length. The movements of the tracer and model are recorded and thereafter duplicated from the record by the tool and work piece. The unit of movement may, for example, be .002 inch. If the tracer is covering the model in horizontal paths, the head will be moved Up or Down only after the completion of each horizontal passage, and the vertical lead screw driven by the motor 10 will be put into motion only at the end of each horizontal passage. The lead screw which controls the Right and Left movements of the table and is driven by the motor 11, and the lead screw which controls the In and Out movements and is driven by the motor 12, will then operate alternately as the table moves back and forth in horizontal passes. For example, the movements may be Right for several units, then In for several units, then Right for several more units, then In again for one or more units, then Right and Out alternatively and repeatedly for varying distances, etc. Then, when the end of the Right passage has been completed, if the unit length is .002 inch and the index movement is .032 inch, the head which carries the tool 1 and tracer 2 will move sixteen units Up or Down. If the surface is flat, this index movement will be made without any In or Out movement. It may be a combination of Up or Down and In or Out straight-line unit movements. Then the Left passage will begin. This is repeated until the entire surface of the model has been contacted by the tracer and the movements have been duplicated with the work piece and the tool.

In passing over a perfectly flat area, the table may move a considerable distance to the Right or Left, or the head may move a considerable distance Up or Down without any In or Out movement. In cutting a 45° slope, if the work is moving horizontally, horizontal movements of one unit will alternate with In or Out movements of one unit until the slope is defined. In making a convex or concave surface, the movements in different directions will alternate, but unit movements in one direction will alternate with movements of multiples of the unit in the other direction. By moving the model horizontally and then indexing Up or Down and passing the model back horizontally, making straight-line movements .002 inch long or a multiple thereof, both in the horizontal directions and In and Out, and repeating this operation until the entire surface of the model has been contacted by the tracer, and making a record each time the movement in any one direction is as much as a unit of .002 inch, recording such unit movements and multiples thereof, a record is obtained from which an almost exact duplicate of the model may be reproduced.

The block 5 may be roughed out before being placed on the duplicator, or the duplicator may work from a cube or other block having a regular surface. After completing the work, the object 5 will be finished off so that the surface of the final product, instead of being made up of a multiplicity of small facets, will be smoothed off to produce curves, etc., duplicating quite closely the surface of the model.

Although the head which carries the spindle and tool 1 and the tracer 2 make only straight-line movements, and the table 6 which carries the model 4 and work piece 5 make only straight-line movements, it is possible to make a record of movements which, when duplicated, will give an almost exact duplication of the model.

The recorder

Figs. 2 and 3 of the drawings illustrate a recorder which, by punching holes in an opaque tape, produces a record which will duplicate when used with photoelectric cells. The movements of the three lead screws which control the movements of the head Up and Down, and the movements of the table 6 In and Out, and Right and Left are recorded for duplication. After the record is completed, an interpreter which operates from the record may be connected in the wiring of a Keller machine to duplicate the movements from which the record was made.

In Fig. 1 the three lead screws which control the movements of the machine in the three primary directions are operated from the motors 10, 11, and 12, which control the Up and Down, Right and Left, and In and Out movements, respectively. The motor 10 and clutches, etc., are located to operate on a horizontal shaft which is connected through bevel gears to a vertical shaft which gives the desired Up and Down movement to the head; and the motors 11 and 12 are connected directly to horizontal shafts which produce the desired movements of the machine table 6.

The recording equipment shown in Figs. 2 and 3 is indicated generally by the reference numeral 20 in Fig. 1. It comprises a bed plate 21 with a keyway 22, which accurately positions the punch mechanism 23, which together with the stop 24 accurately positions the punch box or recorder with the reels 25 and 26 which handle the tape 27.

As the tape passes from the reel 25 to the reel 26, it is perforated by the solenoid punches 30, 31, 32, 33, 34, and 35. Each punch operates in a different lane of the tape. There are six lanes marked in Fig. 2 as Up, Down, Left, Right, Out, and In. The operation of the punches is most easily understood by referring to Fig. 3, which shows the punch 35 in some detail.

The spring 36 of the punch keeps the plunger 37 normally in a lowered position. As an impulse passes through the coil 38, this plunger 37 is lifted. The upper end of the plunger is formed with a sharp shearing edge which, as shown, is inserted in the die 39. The tape 27 passes between the upper end of the plunger 37 and the die 39. As an impulse passes through the solenoid and the plunger is quickly lifted, its upper end removes a small disk from the tape. The tape is moving quite slowly, for example, at the rate of 10 inches per minute, depending upon the size of the hole, etc. The action of the punch is rapid, and the perforations are made in the tape while the tape is moving. If preferred, an intermittent movement may be imparted to the tape, simulating the movement of a moving-picture film through a camera or projector, and the punch will then operate on the tape while it is stationary. Any suitable punch arrangement may be employed.

For the sake of illustration, we have selected in Fig. 3 the punch 35 which is in the In lane. The impulses which activate this punch arise when the lead screw, operated from the motor 12, moves In. When it moves Out, the punch 34 is activated. The impulses which activate these punches arise from movements of the cam wheel 50, the operation of which is best understood by referring to Figs. 4 and 5 although the wheel itself is shown in Fig. 1. Similar equipment is provided on the lead screws connected with the motors 10 and 11, and these, in turn, operate the punches 32, 33 and 30, 31, respectively, in an identical manner.

Fig. 4 shows the clutches 40, 42 which operate the lead screw 41. In a machine of the Keller type, the lead screw is turned to drive the table only when the coils in the magnetic clutches are energized. The clutches are situated in pairs, the two clutches of each pair being rotated on their respective shafts in opposite directions by the drive motor. When the clutch 40 or 42 is magnetized, it pulls the plate 43 or 44 firmly against itself, and the small gear 45 which is keyed to the shaft 46 drives the large gear 45a, causing the lead screw 41 to move the table In or Out.

When a duplicator is operating from a tracer, the amount the table moves to or from the tracer is duplicated exactly by the cutting tool. Whether the movement is large or small, there is exact duplication by the cutting tool. However, in making a record, it is at times advantageous not to record all movements exactly but to record only movements of unit length and multiples thereof. The unit suggested above is .002 inch. Then, when an impulse sent to either the clutch 40 or the clutch 42 is sufficient to move the lead screw 41 in one direction or the other enough to move the table 6 In or Out .002 inch, a record is made of this; or if the duplicator is operating with a vertical spindle and with the work piece in a horizontal plane and it is desired to index .032 inch each time the direction of the table is reversed, then the machine will be arranged to move the lead screw this distance as a single unit or as a multiple of a smaller unit. In the interest of standardization, all of the lead screws are preferably arranged to move the same unit distance every time their respective clutches are actuated. When both the recording and duplicating are based on movements of small unit distances or multiples thereof, substantially exact duplication is possible.

In Figs. 4 and 5 a cam wheel 50 is shown for measuring unit length movements of the lead screw each time it is turned in either one way or the other. The number of lobes 51 on the periphery of the cam wheel 50 will depend upon the pitch of the lead screw, etc. With a lead screw of the type now commonly employed on Keller machines and a cam with sixty-two lobes, each time the pawl 52 moves over a single lobe, it will represent a movement of the lead screw 41 of .002 inch. The pawl is held to the cam by a spring to cause it to follow the surface of the lobes and thus make and break contact at the switch 53 each time the lead screw moves .002 inch.

Each time the switch 53 is closed, the circuit which operates the solenoid punch 34 or 35 (illustrated in Fig. 3) is completed. The current passes through the line 54 which is connected to the toggle switch 55 (Fig. 5) which is thrown to one side or the other by the solenoids 56 and 57. In Fig. 5 the clutches 40 and 42 are shown schematically. In both Figs. 4 and 5 electrical contact is made with the clutches by brushes which bear on the rings 60. The switch 55 and solenoids 56 and 57 are contained in box 55a of Fig. 1.

Referring now to Fig. 1, it will be noticed that the In and Out movement is controlled by the motor 12. To move the table 6 In, the clutch 40 is energized; and to move it Out, the clutch 42 is energized. As shown in Fig. 5, when the In clutch 40 is energized, the current used passes through the solenoid 57 which draws the left arm of the toggle switch to it, and this throws the lower portion of the toggle switch 55 to the left and makes contact between the switch and a point 61. The spring 58 serves to hold the switch 55 on the point 61 until an impulse is received from operation of the clutch 42, which throws the switch 55 in the opposite direction. When the switch 55 makes contact at 61, this closes the circuit 63 which energizes the coil 38 of the punch 35, the circuit being completed through the switch 53 and the line 54. When the clutch 42 is actuated, the toggle switch is thrown in the other direction to contact the point 62 and close the circuit 64, and the solenoid of the punch 34 is actuated.

Thus, we see that the solenoids of the punches 34 and 35 are operated from the pawl 52, and the movement of either punch will be substantially instantaneous as the pawl passes over the high point of a lobe on the cam wheel. Whether the closing of the switch 53 actuates the solenoid of the punch 34 or the solenoid of the punch 35 depends upon whether the clutch 40 or the clutch 42 moves the lead screw 41 and moves the pawl. If the clutch 40 is being actuated and the table is moving In, then the solenoid 33 operates the punch 35, and the tape 27 is perforated in the In lane. When, on the other hand, the clutch 42 is actuated, the punch 34 perforates the tape in the Out lane. If the movement is of unit length—i. e., sufficient to pass one lobe of the cam 50 under the pawl 52—a single perforation is made. If the movement is for a multiple of the unit length, a series of consecutive perforations will be made without any intervening perforation in any other lane.

In making a record, the tape must pass through the recorder at a uniform speed, whether constant or intermittent, in order to obtain exact duplication. For the sake of simplicity, the drawings illustrate a constant-speed mechanism. If desired, the tape may be driven by a sprocket which meshes with the tape as in a moving-picture-machine operation.

In the drawings (Figs. 2 and 3) the tape is drawn through the recorder at constant uniform speed by the rolls 70 and 71. The roll 70 is mounted on the upper portion of the recorder which may be removed when the bolts 72 are loosened. In threading the tape into the recorder, the top is preferably removed. The roll 71 is driven from the motor 73 by the train of gears shown which would step the motion of the motor from 1800 R. P. M. down to 5 R. P. M. at the surface of the roll 71 which may, for example, move the tape at the rate of 10 inches a minute, which is a desirable rate if the holes are small. The record should be designed to operate the duplicator at approximately the rate now commonly employed. The tape may pass through the recorder at a faster rate if the cutting tool is not employed when the tape is made.

The reel 26 is operated at such a speed as to prevent any slack from accumulating in the tape. Any suitable means may be used to accomplish this result. In the drawings the permanent magnets 80, 81 (Fig. 2) are shown for this purpose and operate in a manner similar to that used in operating an automobile speedometer. The magnet 80 is fastened to the reel 26 and the magnet 81 is fastened to the gear 82 which turns at a much higher speed than the magnet 80. When the north and south poles of the magnets are in the positions shown in Fig. 2, the rapidly moving magnet 81 turns the magnet 80 to take up slack. The magnet 81, by turning faster than the magnet 80, intermittently pulls the magnet 80 forward by a constant and gentle motion and prevents the tape from becoming slack.

Although the description refers more particularly to the preparation of a record for the In and Out movements of the table, it is to be understood that the record for the Right and Left movements of the table and the Up and Down movements of the tool are made in the same manner.

The interpreter

The interpreter mechanism is shown connected with a Keller machine in Fig. 6. The showing corresponds with the showing of the Keller machine and recorder equipment illustrated in Fig. 1. In Figs. 1 and 6 like parts are given the same numbers. Figs. 7 and 8 show a plan and elevation of the interpreter, and Figs. 9 and 10 are enlargements showing a compensator arrangement for controlling the movements of a lead screw when operated from a record.

The base 21 with the keyway 22 and stop 24 and the reels 25 and 26 and the means for driving them are the same equipment as shown in Figs. 2 and 3 and are designed for use with either the recorder or interpreter. This is desirable where a single duplicator machine is used both for making the record and for duplication from the record. Such machines are equipped with both a tracer and a cutting tool. (Fig. 16 of Shaw U. S. 1,506,454 illustrates a duplicator of the Keller type and shows a tracer 22 and cutting tool 7.)

To operate a Keller-type machine from the record tape produced in the manner above described, the tape 27 is passed through the interpreter device from the reel 25 and wound onto the reel 26 by the drive rollers 102. The three lead screws of the Keller-type machine which move the table and the head are put in motion by light impulses received in the photoelectric cells 105, 106, 107, 108, 109, and 110 from the constantly burning electric lamps 111, 112, 113, 114, 115, and 116 through the perforations in the tape 27 as it passes between the lights and the photoelectric cells. The imperforate portions of the tape are opaque to the passage of light. Thus, the perforations control the activation of the photoelectric cells; and these, in turn, close the circuits which control the movements of the table and the cutting tool. For example, when light passes from the lamp 111 through a perforation in the tape and falls upon the In photoelectric cell 105, the lead screw moves the table 6 and the work piece 5 toward the cutting tool one unit distance. When a perforation permits the passage of light from the lamp 114 to the photoelectric cell 108, the table 6 moves one unit distance in the reverse direction, namely, Out. In the same way, as light from the lamps 112, 113, 115, and 116 passes through perforations in the tape, the photoelectric cells 106, 107, 109, and 110 are activated, and these cause the lead screws to move the table or tool Right, Down, Left, and Up, respectively.

The method of operating the lead screws from a record will be described more in detail in connection with the In and Out movements of the table, it being understood that the other movements are similarly reproduced and controlled. The photoelectric cell 105 is the one that initiates the In movement, and the photoelectric cell 108 is the one that initiates the Out movement.

The clutches 40 and 42 (Figs. 9 and 12), which are, respectively, the In and Out clutches, control the In and Out movements of the table. As explained in connection with Figs. 4 and 5, the gear 45 (Fig. 9) which is keyed to the shaft 46 moves to the right or the left as the clutch 40 or 42 is magnetized. In this way the table is moved In or Out.

The compensator

The record clearly shows the order in which the various lead screws must be turned in order to produce a duplication of the model. Furthermore, the record indicates the relative distances which the respective screws must move. If it were possible to construct a machine tool in which the physical effort needed to move the table on its ways and to move the head or spindle carriage on its ways were always uniform so that the resulting movement would always be in direct proportion to the power expended, there would be no need for any compensating device. The machine could be operated directly from the record without any further control. However, since the friction at the gibs of machine tools varies from one machine to another and even from one part of one machine to another part of the same machine, it will be seen that at different times more or less energy will be required to move the same or an identical part a specified distance.

The device herein referred to as the compensator is designed to average the movements of each lead screw so that the over-all movement is that indicated by the record. It, likewise, minimizes variations between the intermediate movements of the machine and the intermediate movements indicated by the record. In the type of compensator here shown and described, all movements are resolved into movements of unit length and multiples thereof in the three primary directions, and it is the purpose of the compensator to constantly make the total of the actual movements made by each lead screw, when run from a record, closely approximate the total movement indicated by the record. This is done by establishing a standard of physical movement per perforation in the record and bringing the total movement of each lead screw into accord with the total of such standard movements.

The standard of movement is the actual movement indicated by the record. In the compensator shown in the drawings the total movement according to this standard is indicated by the position of the drum 130 (Fig. 9). It is the purpose of the compensator at all times to correlate the position of the drum 131, which is keyed to the shaft 132, with the movements of the drum 130. The shaft 132 is coupled to the outer end of the transverse lead screw 41 of a Keller machine by suitable means and is journaled in the manner indicated in the case 133, which encloses the greater part of the compensating mechanism. This drum 131 revolves in the one direction or the other when the lead screw is activated by the clutch 40 or 42.

The drum 131 is made of some nonconducting material, such as hard rubber. The two copper contact rings 135 and 136 are fastened in the respective walls of the groove 137 which encircles the drum 131. The contact rings are broken at the extreme right side of the groove and at the extreme left side of the groove, and the broken ends of the rings are crossed by wires embedded beneath the surface of the drum. These two crossing points of the rings are 180° apart, at the left and right extremes of the pattern formed by the contact rings. The reason for crossing the wires will be evident as the description proceeds.

The drum 130 is journaled in the case 133 in any suitable manner. The grooved path 138 which encircles the drum 130 has the same contour as the path 137 in the drum 131.

Keyed to the cam drum shaft 139 are the two ratchet wheels 140 and 141 which are adapted to rotate the cam drum in opposite directions. The drum 131 revolves in the opposite direction from the cam drum 130. The drum 131 is revolved in the clockwise direction by the Out clutch and in the counterclockwise direction by the In clutch. Therefore, the ratchet wheel 141 whose teeth are set for revolving the cam drum 130 in the clockwise direction is actuated when the In magnetic clutch is actuated, and the ratchet wheel 140 whose teeth are set for rotation in the opposite direction is actuated when the Out magnetic clutch 42 is actuated.

Rigidly mounted between the two drums 130 and 131 lying parallel with the shafts of those drums is a square guide bar 143 on which the small carriage block 144 is adapted to slide either to the right or the left. A round pin 145 which forms a part of the carriage block 144 extends into the machined groove 138 of the cam drum 130 and acts as a cam follower. It forces the carriage block 144 to slide back and forth from right to left and left to right on the stationary guide bar 143 as the cam drum 130 is revolved in one direction and the other by the ratchet wheels 140 and 141. A contact roller or brush 146 is attached to the carriage block 144 on the side facing the contact ring drum 131. The contact rings 135 and 136 are spaced apart enough to allow the brush 146 to ride between them. The anchor pin 143a prevents rotation of the shaft 143.

The ratchet wheels 140 and 141 each have the same number of lobes on their peripheries. For each perforation in the record tape one of these wheels is moved a standard number of degrees. This movement of the wheels and drum 130 corresponds to the unit movement of the record; and the spring lock 147, which acts on the gear wheel 148, prevents rotation of the cam drum between movements of the ratchet wheels. The movement of the cam drum 130, therefore, corresponds exactly with the movement indicated by the record and is a standard from which the movements of the lead screw 41 are controlled.

The control of the cam drum 130 over the movements of the drum 131 is effected through the contact rings 135 and 136 and the brush 146 which rides in the groove between them. When the clutch 40 or 42 moves the lead screw 41 exactly the amount indicated by the record, the drums 131 and 130 rotate an equal number of degrees (in opposite directions), and the brush 146 does not touch either contact ring. If the two drums do not move in unison, the brush 146 contacts either the ring 135 or 136, and this automatically increases or decreases the amount of power delivered to the lead-screw drive motor for the next movement of the lead screw 41.

The motor 150 which drives the clutches which move the lead screw is shown in the upper right-hand corner of Fig. 12. The current supplied to this motor passes through wire 151 on one of the resistances 152 or 153, which are of gradually increasing effectiveness. The making and breaking of contacts between the brush 146 and the rings 135 and 136 introduce one resistance or another into the circuit, and the amount of energy supplied to the motor is thus increased or decreased, as will be explained in what follows. The resistances 152 and 153 may advantageously be made variable, as indicated in the representation of 153, and ordinarily the maximum resistance obtainable with the resistance 152 will be less than the minimum resistance obtainable with 153.

The ratchet wheels 140 and 141 which turn the cam drum 130 in one direction and the other are actuated by solenoids 156 which operate the pawls 157 (Fig. 10). Each of these solenoids operates against the action of a spring 158 (Fig. 10) which holds its pawl 157 out of contact with its ratchet wheel until its solenoid is energized and retracts its pawl after the current ceases flowing through the solenoid.

It will now be helpful to follow the 14-volt circuits which are completed by the action of the light on the photo tubes. These circuits actuate the switches 160 and 161 in the 115-volt circuit and thus control the operation of the clutches 40 and 42. The ratchet wheel 140 and 141 is set into motion at the same time.

The source of the 14-volt current is the generator 155. The current is carried through the wire 156 and the wire 166 to the relay 167 or 168. The wire 169 completes the circuit to the photo tube 105, and the wire 170 completes the circuit to the photo tube 108. The wire 172 connects the photo tube 105 with the electromagnet 173, and the wire 174 connects the photo tube 108 with the electromagnet 175. The wire 176 carries the current from the electromagnet 173 to the solenoids 156 which operate the ratchet wheel 141, and the wire 177 carries the current from the electromagnet 175 to the solenoids 156, which operate the ratchet wheel 140. The circuit is completed through the wires 178 or 179 and then through the wires 180 and 181 back to the generator 155.

Therefore, when the photo tube 105 (which is the In photo tube) is energized, the relay 167 draws the contact lever of the switch 160 against the contact point 185 and completes the 115-volt circuit from the current source to the In clutch 40 through the wires 186 and 187 and the wire 188 (which is on the opposite side of the switch 160 and is shown at the top of the drawing). The duplicator lead screw 41 is then revolved toward the cutting tool.

Conversely, when the photo tube 108 is energized, the circuit to the clutch 42 is completed through the switch 161 and the wires 189, 188, and 186, and the lead screw 41 is revolved in such a way as to move the table away from the cutting tool.

We shall now describe how the resistances in the line supplying current to the drive motor 150 are varied. The current may, for example, be supplied from a 115-volt circuit, which may be from the same source as that which drives the clutches. It enters through the wire 190 and passes thence through the line 151 or the resistance 152 or the resistance 153 through the line 191 to the motor, and the circuit is completed through the line 192. It is assumed that the resistance 152 is adjusted to give the current ordinarily required for normal operation. Operating with this resistance, the current passes from the line 190 through the line 193 to the resistance and then through the bar 194 and the closed contacts 195 and the line 196 and thence through the line 191 to the motor. The spring 197 keeps the contacts 195 closed. They are opened when the relay 198 is energized. When the relay 199 is energized, the contact lever 200 is drawn to it and closes the contact points 201; simultaneously, the contact points 202 which are normally closed by the spring 203 are opened. When the contact points 201 are closed, the current to the motor flows through the low resistance wire 151. When the contact points 202 are closed and the contact points 195 are broken, the current must flow through the high resistance 153 to the motor 150. The amount of resistance in the 115-volt circuit feeding the drive motor 150, therefore, depends upon whether current is passed through the relay 198 from the line 205 or whether it is passed through the relay 199 from the line 206 or whether there is no current passing through either the line 205 or 206.

Tracing these lines 205 and 206 back, we find that they are connected with the toggle switch 207, and the position of the toggle switch, in part, determines which relay the current passes through. The passage of current through these lines is also dependent upon whether the contact brush 146 of the compensator, riding in the groove 137, is in contact with the ring 135 or the ring 136 or whether it is near the center of the groove and out of contact with both of the rings. The ring 135 is connected with the concentric contact ring 210, and the embedded ring 136 is connected with the concentric contact ring 211. These contact rings 210 and 211 are connected with the lines 212 and 213 through brushes.

The toggle switch 207 pivots at the point 215. It is never in the neutral position but is always held to the right or to the left by the spring 216. The four contact points 217, 218, 219, and 220 on the toggle switch are cross-connected by the copper plate 221 on the front of the toggle switch and the copper plate 222 on the back of the toggle switch. The toggle switch, when thrown to the left, makes contact with the contact points 223 and 224. When it is thrown to the right, it makes contact with the contact points 225 and 226. The contact points 223 and 225 are terminals for the wire 212 through the wires 228 and 229, respectively. The contact points 224 and 226 are terminals for the wire 213 and are connected therewith by the wires 230 and 231, respectively.

Now we shall suppose that, for one reason or another, the movement of the In clutch 40 is not equal to the table movement indicated by one perforation in the record. The contact ring in the drum 131 will not be revolved counterclockwise the proper number of degrees for this perforation. Since the cam drum 130 always revolves the proper number of degrees for each perforation, the contact brush 146 will be carried by the cam-follower pin to the left the proper amount. Since the pattern of the contact rings 135 and 136 in the drum 131 has not revolved enough to allow the brush 146 to ride in the nonconducting area 137 between the two rings, an electrical contact will be made between the brush 146 and the contact ring 135.

Now, following the circuit from the 14-volt generator 155, we see that the current will flow to the brush 146 by way of the wires 181 and 231. Due to the contact between the brush and the ring 135, the current will be carried into the concentric contact ring 210. There a carbon brush will carry it to the wire 212, and then with the toggle switch thrown to the left as shown in the drawing due to the energizing of the solenoid 173 by current flowing from the In photoelectric cell 105, the current will flow through the terminal 223 and the contact point 217 on the toggle switch to the line 206 and energize the relay 199. From the relay the current flows through the line 156 back to the generator.

When the relay 199 is energized, it draws the contact lever 200 toward it and closes the contact points 201. The current to the clutch drive motor then no longer flows through the resistance 152 but follows the path of least resistance through the low resistance line 151 through the contact points 201 and thence through the contact lever 200 and the wire 191 to the drive motor.

When the current flows through the resistance 152 in normal operation, the voltage from the source of 115 volts is reduced to approximately 110 volts. However, if the machine-table movements fall short of the standard established by the compensator cam drum 130, the compensating device and its wiring circuit cut out the resistance 152 as has been here described, allowing a substantial increase in the voltage to the clutch drive motor through the line 151. Thus, the motor will be able to deliver greater motion to the table per perforation in the record.

On the other hand, if the clutch 40, for one reason or another, delivers more than the proper amount of table movement per perforation in the record, the drum 131 will be revolved more than the proper amount, and the brush 146 will contact the ring 136 embedded in the drum 131. This completes the 14-volt circuit from the generator 155 through the wire 181 and the wire 231 to the contact brush 146 and thence to the contact ring 136. Contact is thus made with the concentric ring 211 and thence through a carbon brush and the wires 213 and 230 to the terminal 224. Then, by contact with the point 218 of the toggle switch, the current passes through the bar 222 and the wire 205 to the solenoid magnet 198. This breaks the normal circuit through the resistance 152 by separating the contact points 195 and compels the current to pass through an even greater resistance 153. The solenoid 199 is not activated when the solenoid 198 is activated, and thus the spring 203 holds the contact lever 200 in position to close the contact points 202. The clutch drive motor 150 thus receives current only through the resistance 153, and this is sufficient to reduce the voltage to say 105 volts, causing a reduction in the speed of the motor and thereby reducing the amount of table movement per perforation in the record.

As soon as the compensator has thus corrected any excess or deficiency in the movement of the drum 131, as compared with the movement of the cam drum 130, the contact brush 146 will again follow its normal path along the nonconducting area in the groove 137 between the rings 135 and 136. The current to the drive motor will then follow the normal course through the resistance 152.

As soon as a perforation appears beneath the photo tube 108, the electromagnet 175 is magnetized, and this throws the toggle switch 207 to the right, bringing the contact points 219 and 220 into contact with the terminals 226 and 225, respectively. As soon as these contacts are made, the effect of the compensator is reversed because the lead screw is being moved in the opposite direction: insufficient movement of the lead screw by the clutch produces contact with the ring 136, and excessive movement of the lead screw produces contact with the ring 135. Such compensation will now be briefly described.

Assuming that the movement of the lead screw by the Out clutch 42 is not equal to the movement indicated by the record, contact will be made between the brush 146 and the ring 136. The circuit is then completed through the line 213 and the lines 231 and 206 to the relay 199 (and not the lines 230 and 205, as was the case when contact was made with the ring 136 when the clutch 40 was actuated). However, the action of the relay is the same as before, and the circuit to the motor 150 is completed through the wire 151 instead of the resistance 152. This speeds up the motor 150 and increases the amount the lead screw is moved thereby for each perforation.

Conversely, if the movement of the Out clutch is excessive, the brush 146 contacts the ring 135, and the 14-volt circuit is completed through the wires 212, 229, and 205, and the relay 198 is energized. The lower resistance 152 is removed from the circuit, and the greater resistance 153 is substituted for it, and the speed of the motor 150 is decreased, reducing the amount the lead screw is moved thereby for each perforation of the tape.

Reference has already been made to the crossed wires 204 (Fig. 9) at each of the reversal points of the path 137 in the drum 131. Assume that the In clutch is operating. This moves the lead screw in a counterclockwise direction. As the movement continues, the brush 146 moves to the left following the groove 137. If the drum 131 falls behind the drum 130, contact is made between the brush 146 and the ring 135, and if the drum 131 is revolving faster than the drum 130, contact is made with the ring 136. However, after the brush 146 passes the point where the direction of the path is reversed, it starts to move back to the right. From that point on, in order that deficiencies in the movement of the drum 131 will continue to produce contact with the ring 136, and excessive movements of the drum 131 will produce contact with the ring 135, it is necessary that these rings cross and be on opposite sides of the groove.

Although the crossing of the rings has been explained in connection with the movement of the In clutch 40, it will be seen that it is, likewise, necessary for proper control of the movement of the lead screw by the clutch 42.

*The operation of the interpreter and compensator from the tape*

Now that the operation of the individual parts of the interpreter and compensator are understood, the operation of the entire mechanism will be considered.

After the tape has been produced in the manner described in connection with Figs. 1–5 of the drawings, it is reeled back onto its original reel in such a way that the perforations will be in the proper order to control the duplicator and cause it to pass through the same movements as when the record was made and to make the movements in the same order.

The tape or record 27 is drawn through the interpreter roller drive 102 and started on the reel 26.

The lead wires of the Keller drive and control circuit (i. e., the clutch-magnetizing circuit and the drive-motor circuit) are disconnected, and the wiring arrangement shown in Fig. 12 is attached to the clutches and the drive motor as illustrated. It is to be understood that the wiring circuit in Fig. 12 represents only that for driving and controlling the action of one of the three lead screws. Each of the three drive screws—horizontal, vertical, and transverse—is controlled in the same manner. To illustrate the operation of the interpreter and compensator, the description will be limited to the transverse or In and Out movement.

The 110-volt clutch drive motor 150, indicated in the drawing of Fig. 12, drives the shafts on which the clutches 40 and 42 are mounted in opposite directions. The clutches are controlled by electrical impulses from the interpreter through the lead wires 186, 187, and 189.

When a perforation appears under the In photo tube 105, the light from the constantly burning electric lamp 111 passes up through the hole in the record and releases electrons from the surface of the cathode plate of the photo tube, and these permit current to flow to the anode plate. The 14-volt control circuit then follows the following course: The source of the current is the generator 155 (upper left-hand corner of Fig. 12). The wire 156 carries the current through the wire 166 to the relay 167 and thence through the wire 169 to the photo tube 105. From the photo tube the current is carried through the wire 172 to the electromagnet 173. From this the current is carried through the wire 176 to the ratchet-operating solenoids 156 which operate the ratchet wheel 141. The circuit is completed back to the generator through the wires 179, 180, and 181. When this circuit has been energized by the action of the light on the photo tube, the solenoid 167 draws the contact lever 160 against the contact 185, and the 115-volt circuit from the current source at the upper left-hand corner of Fig. 12 is completed to the In clutch 40 through the wires 186, 187, and 188. The duplicator lead screw 41 (Fig. 9) is thus revolved enough to move the table in toward the tool approximately one unit of distance.

At the same time, the movement of the ratchet wheel 141 revolves the compensator cam drum 130 the number of degrees corresponding to one unit of motion.

The electromagnet 173 is energized at the same time as the solenoid 167 and the ratchet-driving electromagnet 156, and this draws the toggle switch 207 to the left, making contact between the points 217 and 218 and the terminals 223 and 224. The toggle switch continues in this position until a perforation in the Out lane of the tape permits light to fall on the Out photo tube 108.

Similarly, the operation of the duplicator table in the reverse or Out direction is controlled by the passage of light through a perforation in the tape under the photo tube 108. This completes the 14-volt circuit, energizing the solenoid 168, which draws the contact lever 161 toward it, completing the 115-volt circuit to the Out magnetic clutch through the wires 186, 189, and 188; and simultaneously energizes the solenoid 175, throwing the toggle switch 207 to the right; and simultaneously the 14-volt circuit passing through the wire 177 energizes the solenoids 156 which move the ratchet wheel 140, turning the cam drum 130 in the opposite direction to that in which it is turned by the ratchet wheel 141.

The compensator at all times acts to minimize differences between the movements of the cam drum 130 and the drum 131 which moves with the lead screw. At all times the position of the drum 130 represents the position the drum 131 is intended to have as a result of the total of the In and Out movements indicated on the record. The compensator not only minimizes discrepancies between the successive movements of the two drums 130 and 131, but at all times acts to correlate the sum total of the individual In and Out movements with the total of the In and Out movements intended by the record.

The direction of the movement of the In and Out lead screw may be reversed at frequent intervals. As contrasted with this, the movement of the other screws is more uniformly in one direction. The direction of the movement of the other table lead screw is normally reversed only after the completion of each complete traverse. The indexing movement of the Up and Down lead screw is usually repeated a large number of times without any reversal. Nevertheless, the compensator connected with each lead screw tends to correlate the total amount that screw has moved with the total movement indicated by the record.

Hydraulically operated duplicators

There are two general classes of hydraulically operated duplicators, and the invention is applicable to both classes. The rotary motor-driven type is illustrated in Fig. 13, and the ram type is illustrated in Fig. 14. Identical equipment may be used for operating both types. Fig. 15 illustrates means for producing a record from either hydraulically operated type, and Fig. 16 illustrates a method of operating a hydraulically operated type from a record. Fig. 17 is a wiring diagram of the type which may be used in operating a hydraulic machine in making a record.

Although the duplicators referred to are commonly described as "hydraulically" operated, they are, in fact, operated by oil. The operating mechanism is the same for both the motor-driven and ram types. In Fig. 13 the rotary fluid motor 300 is operated hydraulically and may be moved first in one direction and then in the other, as will be explained below. This motor drives one of the lead screws of a duplicator. Three such motors with the accompanying equipment shown in Fig. 13 will be required for the operation of the three lead screws.

In Fig. 14 the ram type is illustrated. The piston or ram 301 is enclosed in the cylinder 302. The table or head or the like is connected to the piston rod 303. The piston is moved by pumping oil into the reservoir on one side or the other of the piston and removing it from the opposite side in the manner explained below. Three such rams are required for the operation of a duplicator, and the three may be operated identically.

Fig. 13 illustrates the general operation of a hydraulically operated duplicator as it may be carried out in making a record according to this invention and in operating from a record in accordance with this invention. The oil is taken from the oil storage 310 by the pump 311 and delivered to the pressure header 312. The pump supplies the pressure header with a constant supply of oil pressure, and any unused oil is returned to the storage tank 310 through the relief valve 313, keeping the pressure substantially constant.

The motor 300 may be the In and Out motor, or it may be the Up and Down motor, or it may be the Right and Left motor. The movements of the motor in opposite directions are controlled by the valve stems 314 and 315, which are actuated by the solenoids 316 and 317.

In their normal position, the two valve stems 314 and 315 are raised. (See 314 in Fig. 13.) This may be done by springs or other suitable means. When either one or the other solenoid is energized, the valve stem is drawn to it. (See 315 in Fig. 13.) When the valve stem 315 is drawn to the solenoid 317, the port 320 in the stem 315 permits passage of oil from the pressure header 312 through the vertical feed pipe 321 into the pipe 322. The check valve 323 is arranged so that when there is oil in the pipe 322 under pressure, this valve releases the oil to drive the rotary motor 300. The check valve 324 prevents oil from 322 from passing through it but permits oil to return from the motor through it when the motor is being driven in the opposite direction.

The check valves 325 and 326 correspond with the check valves 323 and 324. When oil enters the motor through the line 322 and the check valve 323, it is returned through the check valve 326 and drains down through the drainpipe 328, which corresponds with the pipe 333. The port 329 in the valve stem 314 is open when the valve 314 is in its normal raised position.

To summarize: When the solenoid 317 is energized, the valve 315 is drawn to it; this opens the passage from the pipe 321 to the pipe 322 through the port 320, and the motor is driven by oil which passes through the check valve 323. The used oil returns to the oil storage 310 through the check valve 326 and the by-pass 328 which leads through the port 329 into the return line 330.

When, on the other hand, the solenoid 316 is actuated the valve stem 314 is drawn to it. This brings the port 320 out of alignment with the pipes 328 and 330 but opens the connection between the line 321 and the upright line 327 through the port 331 which corresponds to the port 320 in the valve stem 315. When the valve stem 314 is lowered, the valve stem 315 remains in its normal raised position. The passage between the uprights 321 and 322 is then closed, but the port 332 in the valve stem 315 is brought into alignment with the by-pass 333 and drainpipe 334, which returns the used oil to the reservoir 310.

Movement in the ram-type machine illustrated in Fig. 14 is similarly produced by similarly supplying oil through 323' or 325' and returning it through 324' or 326', etc.

The amount of oil delivered to the motor or ram each time one of the valves is actuated is measured by the oil pressure and the length of time that the valve is opened wide. By maintaining the oil under constant pressure and timing the opening and closing of the valves, a definite amount of oil is introduced to the motor, and this drives the motor a predetermined distance. On this basis, the movements of a hydraulically driven motor or ram, when operated from a record, may readily be compensated for when compared with the operations of a similar machine in the preparation of a record. The use of varying resistances shown in Fig. 12 for use in connection with an electrically operated machine of the Keller type may be replaced by electrical means for varying the time a valve of constant stroke is held open or by varying the stroke of a valve of variable diameter orifice design. Compensation may, likewise, be brought about by varying the oil pressure.

However, it is not necessary to compensate the operation of a duplicator for all types of jobs. For example, an uncompensated machine may be used for roughing out a piece of work. After each passage to the Left and Right, the table may automatically be brought to a zero starting point by the record so that any differences in the length of movement in the table in producing a record and in operating from that record are corrected on each complete pass of the table to the Left or Right. The errors in the In and Out movements may, likewise, be prevented from becoming cumulative by starting each Left and Right movement of the table from a predetermined In and Out zero to which the record automatically takes the table. The Up and Down movements need no correction where the indexing is uniform.

Figs. 15 and 16, respectively, illustrate the production of a record and the operation of a hydraulically driven duplicator from a record. The production of the record will be explained in connection with the wiring diagram shown in Fig. 17.

The wiring diagram comprises a 110-volt circuit and a 14-volt circuit which controls the operation of the 110-volt circuit. The 110-volt circuit switch 350 is located at the upper left-hand corner of Fig. 17, and the 14-volt switch 351 is located directly below it.

The wiring diagram provides for both hand operation and automatic operation of a duplicator. By hand operation is meant the independent operation of any part as desired by the manual operation of a switch. Hand operation is useful, for example, in bringing a machine into position to start a job and for various other operations. By automatic operation is meant the operation of a machine through the control of a tracer. One feature of such automatic operation illustrated in Fig. 17 is the automatic control by which only one lead screw is permitted to operate at one time. Automatic operation will generally be employed in making a record. The equipment shown in the diagram of Fig. 17 is not adapted for the operation of a duplicator from a record.

It will be observed that the equipment shown in Fig. 17 generally falls into three groups. That shown at the left of the figure relates generally to the Up and Down movement of a duplicator. The central portion relates to the Right and Left movement, and the equipment shown at the right relates to the In and Out movement. To a large extent, the different parts are duplicated in each of the three figures. For a movement in each of the three primary directions, two valves are required, such as the valves shown in Fig. 13, which are composed of the solenoids 316 and 317 and the movable valve stems 314 and 315. In Fig. 17 each such valve is indicated by the reference numeral 352 followed by the letter U, D, L, R, I or O to indicate the Up, Down, Left, Right, In or Out valve, respectively. A hand switch is provided for momentary operation of each of these six valves for setting the machine, etc. The momentary switches are indicated by the reference numeral 353 followed by the letters U, D, L, R, I, and O, respectively.

To energize the machine circuits, the switches 350 and 351 must be closed. Then the head or spindle may be moved Up and Down by closing the momentary contact switches 353—U and 353—D. To energize either table circuit, the switch 355 or 356 must be closed. These latter switches are the "power" switches for the Left-Right and In-Out movements, respectively. Switches 350, 355, and 356 are the 110-volt "power" switches, and switch 351 is the 14-volt control-circuit "power" switch.

The wires 357 and 358 leading from the switch 355 and the wires 359 and 360 leading from the switch 356 enter the switches 361 and 362, respectively. These switches are adapted to provide both hand operation and automatic operation. When the switch 361 is thrown up for hand operation, the wire 365 carries current to the momentary switches 353—L and 353—R, which lead to the solenoids in the valves 352—L and 352—R, respectively. The lines 366, 367, and 368 complete the circuits for momentary operation of the Right and Left valves.

Similarly, when the switch 362 is thrown up for hand operation, the momentary switches 353—I and 353—O are connected into the circuits with the wires 370, 371, 372, 373, and 374, which provide for momentary operation of the In and Out valves 352—I and 352—O.

The wiring at the left-hand side of the page is for raising and lowering the head and tracer or spindle. When the tracer center point 380 is idle, it rests on the lower tracer point 381. In operation it sometimes contacts this point to lower the head, and at other times it contacts the point 382 to raise the head. In automatic operation with the tracer running over a model, the surface of the model directs the operation of the machine (through the tracer, wiring system, and hydraulic motors) and determines whether the tracer center contact point 380 touches the point 381 to lower the head or 382 to lift it.

When the duplicator is not in operation, no current flows through the Up and Down mechanism until the switch 383 has been closed for automatic operation or one of the momentary switches 353—U or 353—D is closed. If it is set for hand operation, then when the switch 353—D is closed, momentary Down operation is effected. For momentary Up operation the left-hand blade of switch 383 is brought up into contact with the contact marked "Hand operation." Then by closing the switch 353—U, momentary Up operation is accomplished. The circuit to the Up or Down valve is closed through one of the switches referred to, and the circuit is completed through the wire 385 and the solenoids 387 or 388.

To operate either the valve 352—U or the valve 352—D, the solenoid 387 or 388, respectively, must be energized because the solenoids which form a part of these valves are connected in series with the solenoids 387 and 388, respectively. If the solenoid 388 is energized, the switch 389 is drawn to it, and contact is broken at the point 390. Similarly, when the solenoid 387 is energized, the switch 391 is drawn to it, and the contact point 392 is broken. The 110-volt current for the Left, Right, In, and Out movements is fed from the switch 350 through the line 393 across the switch 389 and across the switch 391 through the line 394 to the switch 355 and through the line 395 to the switch 356. If either the Up or Down valve is in operation, this 110-volt circuit is broken at the contact points 392 or the contact points 390, and no current passes to the switch 355 or 356. This prevents simultaneous operation of the Up or Down valve with any of the other valves.

For automatic operation, one or more of the switches 350, 355, and 356, which are in the 110-volt circuit, must be closed; and, in addition, the switch 351 which controls the 14-volt circuit must be closed. The switches 383 and 361 or 362 must be thrown down to make connections for automatic operation. Thus, any particular movement or all of the movements of the table and head are brought under the control of the tracer and will be directed by the surface variations of the model.

The 14-volt circuit, which is controlled by the switch 351, is connected through the wire 400 with the hand reverse switch 401. The lead wire 402 connects the switch 351 and the solenoids 403 and 404. From the solenoids 403 and 404 the 14-volt circuit is connected with the trip switches 406 and 408, which may be of the usual type and are located to be operated by "trip dogs" and the movements of the table of the duplicator. The position of the dogs which operate these trip switches is changed from time to time, as is customary in the art. When not pushed to one side or the other by a dog, these switches are held upright by the springs shown.

The wiring diagram relates to a hydraulically operated duplicator which operates with a vertical spindle. The head of the duplicator moves up and down over the model. In a case of this type there is only one essential movement of the table, and this moves the length of the job and then reverses with indexing to prevent the tool from traveling in the same path in both directions. The essential table movement may be from Left to Right and then from Right to Left with the indexing either In or Out, or the indexing may be Left or Right, and the main table movement may be in either the In or the Out direction of the table. The trip switch is not used for indexing. Only one trip switch for each table direction will be employed, and it will automatically limit the movement of the table in opposite directions. The indexing will be done by hand operation. Therefore, although two trip switches are provided to control the operation of the table, one for each direction, only one trip switch will be used at any one time. The selector switch 409 will be thrown either up or down to determine in which of the two directions—i. e., Left and Right or In and Out—the machine will be operated when set for automatic operation.

When the selector switch 409 is thrown up, the trip switch 408 is connected for automatic operation, and the table will be moved In and Out automatically through operation of the valves 352—I and 352—O while its Right and Left movements will be controlled by the momentary switches 353—L and 353—R, with the switch 361 thrown up. When, on the other hand, the selector switch 409 is thrown down, the trip switch 406 is connected for automatic control, and the table will be moved Right and Left automatically by the valves 352—R and 352—L, and the switch 362 will be thrown up for momentary hand control of the In and Out movements.

When the primary movement of the table is back and forth from Right to Left and Left to Right, the trip switch 406 will automatically reverse the movement of the table at the end of each complete traverse. The springs shown hold the switch 406 in the vertical position, except when pushed to one side or the other by one of the dogs fastened to the table. If the movement has been from Left to Right, when the dog trips the switch, it is moved in contact with the point 406A. The 14-volt circuit is then completed from the switch 351 through the wires 400 and 410 to the switch 406, which is thrown in contact with the wire 406A. This completes the circuit through the wires 411 and 411a back through the solenoid 404 and the wire 402 back to the switch 351. This throws the toggle switch 407 to the position shown in Fig. 17. On the other hand, if the table is moving in the other direction, the switch 406 is thrown so as to make contact with the point 406B, and this completes the circuit through the wires 412 and 413 up through the solenoid 403 and back through the wire 402 to the switch 351.

The switch 407 is always thrown in one direction or the other. When once thrown to the right, it is held in this position by the spring 415 until current is passed through the solenoid 403. The switch is then thrown in the other direction and held in that position by the spring 415 until current is again passed through the solenoid 404. In the position shown in Fig. 17 the switch 407 makes contact with the point 416. With the selector switch 409 thrown down so that the current will flow to the Right or Left valve 352—R or 352—L, the 110-volt circuit is completed from the switch 361 through the wire X′ and the wire X to the switch 407 and then through the wire X² to the selector switch 409 and thence through the wire 418 to the valve 352—L. If, on the other hand, the movement has been such as to move the trip switch 406 into contact with the point 406B, the 14-volt current will flow through the wires 412 and 413 into the solenoid 403, and this will throw the switch 407 in the opposite direction to make contact with the point 417. Then the 110-volt circuit from the switch 361 will pass through the wire X' and the wire X through the switch 407 and thence through the wire X³ into the selector switch 409 and from there through the wire 419 to the valve 352—R.

With the control switch 409 thrown down, the movement is always to the Right or to the Left, provided the tracer points are not moving the head up or down. With the switch in this position, the movement from Right to Left or Left to Right may also be reversed by throwing the switch 401. If prior to throwing the switch, the current is flowing from the switch 351 through the wire 400 to the switch 401 and thence down through the wire 420 and connecting with the wire 412, after the switch is thrown, the current is, instead, available through the wire 421 into the wire 411. By throwing the switch 401, the current may be reversed so that instead of flowing to the solenoid 403, it will flow to the solenoid 404 and change the position of the switch 407; or if previously it has been flowing through the solenoid 404, it will henceforth flow through the solenoid 403 and the position of the switch 407 will be reversed.

In view of the complete explanation given above in connection with the operation of the trip switch 406, it is unnecessary to explain in detail the operation of the trip switch 408. With the table moving in one direction, the contact is made through the point 408B and thence to the wire 412, and moving in the reverse direction, the contact of the trip switch 408 is with the point 408A, and the circuit will then be completed through the wire 411. As above explained, when the current is passing through the wire 411, the solenoid 404 is energized, and when it is passing through the wire 412, the solenoid 403 is energized. The trip switch 408 is only active when the selector switch 409 is thrown up. The connections from the selector switch are then made with the valves 352—I and 352—O instead of the valves 352—L and 352—R.

Fig. 15 illustrates means for making a record from the operation of a hydraulically operated duplicator, and a duplicator wired as shown in Fig. 17 may be utilized. The drawing illustrates diagramatically the making and use of a photoelectric record of light-sensitive film, such as moving-picture film.

In making the record, the film is wound from the roll 450 onto the roll 451. The movement may be continuous, or it may be intermittent as in the operation of a moving-picture camera or projector. If intermittent, it should be synchronized with the movement of the valves which should be uniform. If continuous, the record will show streaks of uneven length representing the time which each valve is open. The film, when developed, will show the different dots or streaks; and, as explained in connection with Fig. 16, such a record may be used with photoelectric means for operating a duplicator.

Fig. 15 shows more or less diagrammatically an elevation of mechanism for the operation of only two valves of a duplicator. The record for the operation of each valve will be produced in a separate lane, as in the preceding figures. The finished film will normally, therefore, comprise six lanes of dots and dashes of uneven length, and the mechanism shown in Fig. 15 will be twice duplicated for recording in the other four lanes.

The record is made from light conducted by the two Lucite tubes 452 and 453 from the lamps 454 and 455 to the film 456. The lamps are of the type which light instantaneously and have no afterglow, or a constant light may be used with appropriate shutter mechanism for intermittently exposing the film to the light.

When the tracer of the duplicator of the hydraulic machine is run over a model to make the record, its movements will be controlled automatically by wiring of the type shown in Fig. 17. Fig. 15 illustrates the production of a record for the Up and Down movements, but it is to be understood that Fig. 15 is not limited to the scope of what is actually illustrated because, in fact, it illustrates the operation of a duplicator in each of the three primary directions.

Identifying the units shown in Fig. 15 with the units shown in Fig. 17 and limiting ourselves to the equipment for the Up and Down movements, we find the switch 350 for the 110-volt circuit shown in each drawing. The three tracer points 380, 381, and 382 are identified in each figure. The switches 353—D and 353—U are also shown. The solenoid valves 352—U and 352—D, which appear in the lower left-hand corner of Fig. 17, are shown on opposite sides of Fig. 15. The connections between the various units are the same in each drawing. The two solenoids shown in the lower left-hand corner of Fig. 15 are the solenoids 387 and 388 shown at the bottom of Fig. 17 toward the left.

With such equipment as that shown in Fig. 17, a photoelectric record may be prepared by connecting the lamps 454 and 455 across the terminals of the solenoids in the valves 352—D and 352—U, as illustrated, and similarly connecting other bulbs across the terminals of the other solenoids in the valves 352—I, 352—O, 352—R, and 352—L. When current is passed to the solenoids for operation of the valves, the lights will go on in the respective bulbs, and the light will be conducted by the Lucite rods to the film where the exposures will be recorded.

After the film has been developed, it will be inserted into an interpreter, such as that illustrated more or less diagrammatically in Fig. 16. The record 460 will be reeled from the reel 461 onto the reel 462 by any satisfactory mechanism. The movement may be continuous or intermittent. Lights from the continuously burning lamps 463 and 464 will be conducted through the Lucite tubes 465 and 466 up into the photoelectric tubes 467 and 468. The film 460 will be composed of an opaque background with transparent exposure areas. The light will pass through these exposure areas, and as it does so, current will flow through one of the photoelectric tubes, completing the 14-volt circuit.

To operate, the switch 469 which controls the 14-volt circuit and the switch 470 which controls the 110-volt circuit must both be closed. Then, the current from the 14-volt circuit will pass through the wire 471 and then through the wire 472 to the photo tube 467, or through the wire 473 to the photo tube 468. If light is falling on the photo tube 467, the current will return through the wire 474 and energize the solenoid 475 and return through the wire 476 to complete the circuit to the switch 469. If, on the other hand, light is falling on the photo tube 468, the circuit will be completed from the wire 473 through the tube and back through the wire 480 through the solenoid 481 and then back through the wire 476 to the switch 469.

As current passes through the solenoid 475 or 481, it draws the switch 483 or 484 to it, completing the 110-volt circuit through the solenoid 485 or 486. The solenoids 485 and 486 operate the valve stems of In and Out, Up and Down or Right and Left valves for operation of the duplicator. With three sets of the equipment shown in Fig. 16, it is thus possible to control the movements of a duplicator in all of the three primary directions from six photo tubes.

*Production of opposites*

In the duplicators now in use each machine is operated independently of every other machine. This, however, is not necessary. It is possible to connect a number of machines so that the cutting tools will operate in unison. In certain operations it is not necessary that compensators be provided, as, for example, in roughing out blocks of metal or wood for the subsequent manufacture of pieces by satisfactorily compensated duplicating machines. For instance, if a number of identical dies are to be manufactured, it may be desirable to first rough out the blocks from which the dies are to be made by starting with cubes of metal or wood. Several such cubes may be fastened to individual machines, and the machines may then all be connected with one control, which may be operated either from a tracer or a record. If, for example, electrically operated duplicators are to be employed, such as, for example, duplicators of the Keller type, the lead wires to the magnetic clutches controlling the movements of the table and cutting tool of the control machine may be tapped and extensions made to the corresponding magnetic clutches of the other machines which are to be employed. In this way, cubes may be roughed out; and, subsequently, the roughed blocks may be used for the manufacture of the dies on individual duplicators or on a battery of duplicators, each of which is equipped with a suitable control to give exact duplication. For example, the jobs may be finished on six such machines, the clutches of which are provided with compensators of the type above described. In this way, by passing the tracer over a single model, a half dozen exact duplicates may be produced in the one operation. The various duplicators may be located in the same shop or at remote distances, as, for example, where a single manufacturer, such as an automobile manufacturer, has plants in different parts of the country, the connections may be made over long-distance communicating systems.

A particular adaptation of such multiple duplication makes possible the production of left and right duplicates from a single model. For example, in the production of a particular drive mechanism where two parts are required which are opposites of one another, the right and left may be made simultaneously from a single record. It is not necessary to have a left model and a right model or to have a left record and a right record. A wiring diagram for such multiple production is illustrated in Fig. 18. Here four machines—machine A, machine B, machine C, and machine D—are connected for operation from a single record. In a machine with a horizontal spindle, as shown in Figs. 1 and 6, the wiring for the In and Out movements will be of the type used in ordinary duplication. The only difference in wiring will be for the Right and Left movements or for the Up and Down movements. For a machine with a vertical spindle, the wiring for the Up and Down movements will not be changed, and the wiring for either the traverse or transverse movements of the table will be crossed. For the purpose of illustration, Fig. 18 shows the crossing of the Left and Right wiring, as in a duplicator with a horizontal spindle, such as illustrated in Figs. 1 and 6.

In Fig. 8 the photoelectric cells for control of the Right and Left movements of the lead screw controlling the traverse movements of a duplicator from a record are designated by the reference numerals 106 and 109. In Fig. 17 they are designated as 106' and 109', respectively. The upper part of Fig. 17 is merely a fragmentary showing of the corresponding portion of Fig. 12. The wires 505a and 508 correspond to the wires 186 and 188, respectively, of Fig. 12. Therefore, from the previous detailed description of the In and Out movements given in connection with Fig. 12, it will readily be seen that as light falls on the Right or Left photo tube, the solenoid 500 or 501 will be energized by the 14-volt circuit, and the switch bar 502 or 503 will be drawn down completing the 115-volt circuit through the terminal 504 of the wire 505 or through the terminal 506 of the wire 507. The two magnetic clutches for Right and Left lead screws of the four machines—machine A, machine B, machine C, and machine D—are illustrated in Fig. 18. In each of these machines the two clutches are located as shown. For example, the clutches 510A, 510B, 510C, and 510D represent the Right drive clutches of the four machines, and the four clutches 511A, 511B, 511C, and 511D represent the Left drive clutches of the four machines. In making right and left opposites, the wires are crossed so that whenever the tables of the machines A and B move to the Right, the tables of the machines C and D move to the Left, and vice versa. This is done by connecting the clutches 510A and 510B of the machines A and B with the wire 505 and the clutches 511C and 511D of the machines C and D with this same wire 505 and connecting the two clutches 511A and 511B of the machines A and B with the wire 507 and the two clutches 510C and 510D of the machines C and D with this same wire 507. The compensators of the four machines which control the movements of these four lead screws are correspondingly connected with the wires 514 and 515 of the 14-volt circuit leading from the photo tubes 106' and 109', respectively. In this way two rights and two lefts are produced simultaneously from the same record.

Fig. 19 shows a switch mechanism for making a single right or left on the same machine from the same record. No such complicated switch arrangement is required to make a plurality of rights and lefts simultaneously. As shown in Fig. 18, machines A and B are operated normally. Switches are indicated for disconnecting the different machines, as, for example, at X and Y. By disconnecting at these points and putting the plug from X into Y and the plug from Y into X, no opposites are made, but each machine will operate normally. Conversely, the wires may be crossed at any two switches to make any desired number of rights and lefts.

One does not always want a plurality of parts. For example, one may desire a single right or a single left. This may be produced from a record by direct wiring or by crossing the wiring as necessary. The crossing may be done by a single switch although, for the purpose of illustration, four switch blades are shown in Fig. 19. The switch determines whether the compensator and clutches are to be connected directly or whether the wiring is to be crossed for each. Using numbers corresponding to those employed in connection with Fig. 18, the wires 505' and 507' lead to the clutches, and the 115-volt circuit is completed through the wire 508'. The numbers 140', 141', 173', 175', 176', and 177' correspond to the parts 140, 141, 173, 175, 176, and 177 of Fig. 12 but indicate parts of the Right and Left circuit instead of the In and Out circuit as in Fig. 12.

The solenoids 500' and 501' form a part of the 14-volt circuit, and the four switch blades 520, 521, 522, and 523 determine whether a movement indicated on the record for the traverse of the lead screw is to be made in one direction by energizing the solenoid 500' or is to be made in the opposite direction by energizing the solenoid 501'. Depending upon whether the indicated movement is translated into action through the solenoid 500' or 501', the compensator will be moved in one or the other of the opposite directions. To understand the wiring, one must understand the relation of the contact points 530, 531, 532, and 533 and the contact points 540, 541, 542, and 543 with the four blades 520, 521, 522, and 523. The contact points 530 and 540 are connected by the wire 550. The contact points 531 and 541 are connected by the wire 551. The contact points 532 and 542 are connected by the wire 552 which leads to the solenoid 501'. The contact points 533 and 543 are connected by the wire 553 which leads to the solenoid 500'.

If light falls on the tube 106' when the switch for crossing the circuits is thrown to the extreme right, the 14-volt current flows through the solenoid 500' (and this actuates the Right clutch) and thence through the line 553 to the contact point 533, then through the blade 521, through the tube 106', then through the blade 520 and the contact point 531 and the lines 551 and 562, through the solenoid 173' and the wire 176' to the ratchet wheel 141'. The photo tube 109' is dead; so no current flows through that branch of the switch.

If light falls on the tube 106' when this switch is thrown to the left, the current enters this tube through the solenoid coil 501' and actuates the Left magnetic clutch. The current flows from the solenoid coil 501' through the wire 552 and contact point 532, through the blade 521 to the photo tube and then through the blade 520 to the point 530 and through the wires 550 and 566 to the solenoid 175' and then through the wire 177' which turns the ratchet wheel 140' which turns the compensator drum in the opposite direction from the ratchet wheel 141'.

If, on the other hand, light falls on the tube 109' when the switch is thrown to the right, the current flows through the solenoid 501' to the contact point 542, thence through the blade 523, through the tube 109' and out the blade 522 to the contact point 540 and thence through the wires 550 and 566 to the solenoid 175' and then to the ratchet wheel 140'.

Or, if light falls on the tube 109' when the switch is turned to the left, the current flows through the solenoid 500' and the wire 553 to the point 543, the blade 523, the photo tube 109', the blade 522, the contact point 541, and the wires 551 and 562 to the solenoid 173' and the solenoids which operate the ratchet wheel 141'.

It is evident from the above that by simply throwing a single switch, one record tape may be used to produce either a right or left of two opposites, as desired.

When the four blades 520, 521, 522, and 523 are thrown to their right-hand contacts, the machine operation is normal (for example, a record of a right model will produce a "right" job).

When the blades 520, 521, 522, and 523 are thrown to their left contacts, the operation of the machine will be opposite that of the model which produced the record (for example, a record of a "right" model will produce a "left" job).

By crossing the In and Out clutches in a duplicator with a horizontal spindle, one will not obtain the ordinary opposites, but the surfaces of the two jobs will be complementary. Where there is an indentation on one, there will be a protuberance on the other, and vice versa.

We thus see that it is possible to make a plurality of like parts and, likewise, that it is possible from a single record to make identical and opposite parts, and it is further possible to make a plurality of either or both simultaneously. Likewise, from a single record it is possible to make complementary parts, and a plurality may be made simultaneously if desired.

Continuous tapes

Continuous tapes or endless records may be used on some types of known duplicators properly equipped and on machines of special design. They may, likewise, be used on other machine tools. This type of operation is sometimes possible and desirable on mass-production jobs. It is particularly applicable to machines having turret arrangements or other such fixtures that enable the operator to attach a job or work piece to one part of the work support while the cutting tool is active on another work piece of the same kind on, say, the opposite side of the work support.

At the completion of the cutting of one piece of work, the table automatically moves that work piece aside, and the other uncut work piece is moved up to the cutting tool. The record or tape control thus causes the table and spindle to be moved to their proper starting positions, and the cycle of operations or movements is begun again. The applications of an endless tape or record are so numerous that it is impossible to describe them all here. It is possible, however, to say that these machines will be controlled in a manner not unlike that of the machines previously described. The record will be made from a model or a template with a tracer, control wiring, and other devices previously described. The table or carriage movements and the tool head or spindle movements will be accomplished by either electric motors and magnetic clutches acting through lead screws or fluid motors acting through the machine-tool lead screws. Or the machine movements may be accomplished by means of a ram and cylinder and a controlled flow of hydraulic fluid. In either case the apparatus necessary will be of the same general design as described in connection with the Keller-type machine and the hydraulically driven machine. There will be table or work movements of unit lengths and tool or spindle movements of unit lengths. The tape or other record will not be greatly different from those previously outlined, except that the ends will be connected and the design of the reels will be altered to handle the tape in a proper manner. The tape-driving rollers will serve as in the standard design to draw the tape through the interpreter box, and the photo tubes and wiring circuit will serve to control the machine-tool movements.

*Making a full-sized job from a miniature model*

With a duplicator of the type now generally available, it is necessary to use a model the same size as the finished piece. Operating according to this invention, it is possible to use a miniature model. For the purpose of illustration, it will be supposed that the model is half the size of the finished job.

One way of operating from a miniature is to make a record, such as is made from a life-sized model, and reproduce the job directly from this record. The record may be made with a duplicator of the Keller type, for example, by using equipment of the type illustrated in Fig. 5, with a cam wheel 50 twice the normal size and with two times the normal number of lobes. For example, in the illustration used in connection with Fig. 5, it has been suggested that sixty-two lobes be employed. In operating from a half-size model, a cam with one hundred and twenty-four lobes would then be employed. In producing a record in this manner, when the work piece is moved a short distance under the tracer, twice the number of lobes will have been brought into action, and the tape will have twice the number of perforations that will normally be made. This tape with twice the perforations made from a one-half-sized model will produce a life-sized job directly.

To coordinate the operation of the recording mechanism with the enlarged cam, the gears in the recorder-drive-box mechanism must be changed so as to drive the tape at twice the normal speed; i. e., twice the speed at which it is later to be run through the interpreter.

The tape produced in this manner will be identical with the tape produced from a life-sized model in the standard recorder. The tracer will have covered the entire surface of the model, and using the larger cam wheel with twice the normal number of lobes, the record is perforated or otherwise marked twice for each actual unit of table movement.

This record will be reeled back onto its original reel and is then ready for use with a duplicator in the normal manner. The interpreter reels, when operating on this tape, will be driven at normal speed and in the same manner as would be the case had the record been made from a full-sized model. In operating from a hydraulic duplicator, like changes are made to produce a full-sized job from a miniature model.

When the record is made photographically, it is possible from a negative to make a positive in which the opaque areas are twice the length of the exposures on the positive, and this may be done without widening the film, as by running the negative at half the speed of the film which is to be developed into the positive.

The operation of a duplicator or other machine tool from a record offers various advantages. In the first place, a model is fragile and becomes damaged in repeated use. In operating from a record, the model used in making the record need be used but once and can then be discarded. All duplications from a record are exact, whereas duplications from the model vary as the model becomes damaged. Also, many errors which result from human frailties are eliminated. The use of photographic records has certain advantages, such, for example, as the possibility of producing positives from negatives at remote places, using photoelectric reproduction of the type now employed in transmitting photographs, etc.

A further advantage of the use of a record, made from a model, for controlling a duplicator of the Keller type is that it eliminates costly, elaborate, and bulky cams, etc., now commonly employed to control the action of these machines.

On machines of the screw-machine type, when the size of the job and the size of the machine and the location and spacing of the spindles permit, two or more tools may be used at one time on a single job, thus reducing the time necessary for doing the job. Such multiple-tool operation is possible while operating from a tape.

The shipment and storage of models presents various difficulties. After a record has been made, the model may be destroyed, and the record may easily be stored. It may also easily be shipped in a small container.

A large operator may wish to have several records. For instance, where plants are located in different parts of the world, it may be desirable to have a complete complement of records at each plant. If the record is made photographically, a number of positives may easily be made from the negative. If the record is made by perforations, several tapes may be perforated at one time. If preferred, a master tape may be produced from which additional tapes may be made by any suitable duplicating means. For example, an electrically conducting lacquer may be brushed through openings in the master tape to produce a record run by electrical contact. If preferred, several recorders may be operated simultaneously while a tracer is run over a model to produce several records directly.

Various advantages in operating from a record will be evident from the description here given, and others will develop as the invention is put into commercial use.

What I claim is:

1. The method of producing a job from a record on a machine tool by a part which is capable of moving in opposite directions, which comprises operating a control simultaneously with operation of the part and moving the control exactly in accord with the record, and by such movement controlling the movement of the part to only approximate the movement of the control and keeping the total of the movements of the part in both directions approximately equal to the total of the movements of the control in both directions.

2. The process of duplicating the traverse movement of a machine tool from a record which comprises at intervals supplying to the traverse-moving mechanism the power previously estimated as that required to complete fractions of the traverse movement and in adjoining intervals varying the power supplied to compensate for excesses and deficiencies in the fractional movements as compared with the corresponding movements indicated by the record.

3. The process of controlling from a record the transverse movements of the table of a duplicator adapted to move in diametrically opposed directions at intervals, which comprises at one interval supplying to the table-moving mechanism the power previously estimated as that required to move the table the distance indicated by the record; and when the power supplied moves the table more than the distance indicated, at the next interval, if the movement be in the same direction, supplying less power than that previously estimated as required to move the table the distance indicated by the record; and if the movement be in the opposite direction, supplying more power than that previously estimated as required to move the table the distance indicated by the record, and thus compensating for excessive and deficient transverse movements of the table so that in any prolonged period in the operation of the duplicator from the record, the distance of the table from the cutting tool is approximately that intended by the record.

4. A duplicating machine which comprises a table and means for moving the same in opposite directions at different times, a compensator, a control device therefor and a record, means for moving the control device distances corresponding exactly to those indicated on the record for movements of the table, means for moving the table approximately the distances indicated on the record, and means in the compensator for equalizing the total of the movements of the table and the total of the movements of the control device.

5. In a duplicator two electromagnetic clutches with a motor for operating them continuously and means for driving a lead screw in opposite directions therefrom, a plurality of conductors of different resistance leading to the motor, a compensator with a control which indicates the intended total movement of the lead screw, and means for automatically directing the current to the motor through a conductor of greater resistance when the lead screw is ahead of the control and through a lesser resistance when the lead screw is behind the control.

6. A duplicator, a pair of magnetic clutches associated with a lead screw thereof for moving the lead screw in opposite directions, a driving motor connected to drive the clutches, a plurality of conductors of different resistance adapted to be connected to the motor, two switches for operating the clutches, two photo tubes for controlling the operation of the lead screw by the clutches, a conductor connecting each photo tube with one of the switches, a control operated from the photo tubes which registers the desired position of the lead screw at all times, means operated automatically from the photo tubes and control for supplying the motor through a conductor of greater resistance when the clutch moving the lead screw ahead is operating and the control is ahead of the lead screw, and for supplying the motor through a conductor of less resistance when the clutch moving the lead screw ahead is operating and the control is behind the lead screw, and for supplying the motor through a conductor of greater resistance when the clutch moving the lead screw back is operating and the control is behind the lead screw, and for supplying the motor through a conductor of less resistance when the clutch moving the lead screw back is operating and the control is ahead of the lead screw.

7. A compensator for a duplicator with a lead screw operated from a record, two magnetic clutches for operating the lead screw in opposite directions, a motor for driving the clutches, and a plurality of conductors of different resistance supplying the motor, which compensator comprises two photo tubes activated by the record, two drums—the first connected to move with the lead screw, the second operated by the photo tubes in an opposite direction from the first—two spaced wires on the first drum connected through a switch with the conductors supplying the motor, a conducting control between the spaced wires, and control means leading from the photo tubes to the switch so as to cross the connections from the first drum to the conductors each time a different photo tube is lighted.

8. A duplicator with a lead screw therein, a first drum connected to rotate with the lead screw, two spaced electrical conductors on the drum, a second drum to control the first and connected with driving means to rotate the second drum in the opposite direction to that in which the first is rotating, and a conducting control adapted to move axially of the drums one way and the other as they rotate in one direction and the other and located between said spaced conductors.

9. A duplicator in which each lead screw is operated by two magnetic clutches, a motor to drive the clutches, three wires of higher, lower, and intermediate resistance leading to the motor, a compensating device which comprises a drum connected to rotate with the lead screw, two spaced conductors on the drum which rotate with it, a movable conducting control between the spaced conductors, and automatic means conducting current to the motor through the wire of intermediate resistance when the said conducting control is out of contact with both of the spaced conductors and for conducting current to the motor through one of the other wires when the conducting control contacts one of the spaced wires to thereby alter the speed of rotation of the clutches so that the drum and conducting control move approximately together.

LLOYD BLAIR SPONAUGLE.

REFERENCES CITED

The following references are of record in the file of this patent:

UNITED STATES PATENTS

| Number | Name | Date |
|---|---|---|
| 840,876 | Steedman | Jan. 8, 1907 |
| 1,172,058 | Scheyer | Feb. 15, 1916 |
| 1,381,752 | Scheyer | June 14, 1921 |
| 1,444,242 | Faust | Feb. 6, 1923 |
| 1,683,581 | Shaw | Sept. 4, 1928 |
| 1,912,707 | Harriman | June 6, 1933 |
| 1,930,155 | Wiedemann | Oct. 10, 1933 |
| 1,938,781 | Nenninger | Dec. 12, 1933 |
| 1,975,791 | Hopkins | Oct. 9, 1934 |
| 2,005,018 | West | June 18, 1935 |
| 2,108,025 | Shaw | Feb. 8, 1938 |
| 2,129,049 | Doran | Sept. 6, 1938 |
| 2,213,108 | Pollard | Aug. 27, 1940 |
| 2,218,818 | Harrington | Oct. 22, 1940 |
| 2,283,240 | Trinkle | May 19, 1942 |
| 2,307,503 | Gulliksen | Jan. 5, 1943 |

FOREIGN PATENTS

| Number | Country | Date |
|---|---|---|
| 111,789 | Australia | Apr. 27, 1939 |